(12) United States Patent
Sun et al.

(10) Patent No.: US 12,069,708 B2
(45) Date of Patent: Aug. 20, 2024

(54) BEAM MANAGEMENT ENHANCEMENT FOR DISCONTINUOUS RECEPTION (DRX) OPERATION

(71) Applicant: Apple Inc., Cupertino, CA (US)

(72) Inventors: Haitong Sun, Cupertino, CA (US); Li Su, Cupertino, CA (US); Yushu Zhang, Beijing (CN); Dawei Zhang, Saratoga, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 17/442,252

(22) PCT Filed: Feb. 12, 2020

(86) PCT No.: PCT/CN2020/074916
§ 371 (c)(1),
(2) Date: Sep. 23, 2021

(87) PCT Pub. No.: WO2021/159326
PCT Pub. Date: Aug. 19, 2021

(65) Prior Publication Data
US 2022/0377756 A1     Nov. 24, 2022

(51) Int. Cl.
*H04W 72/542*     (2023.01)
*H04W 24/08*     (2009.01)
(Continued)

(52) U.S. Cl.
CPC ......... *H04W 72/542* (2023.01); *H04W 24/08* (2013.01); *H04W 52/242* (2013.01); *H04W 72/21* (2023.01); *H04W 76/28* (2018.02)

(58) Field of Classification Search
CPC . H04W 72/542; H04W 24/08; H04W 52/242; H04W 72/21; H04W 76/28;
(Continued)

(56) References Cited

U.S. PATENT DOCUMENTS

2015/0078189 A1*  3/2015  Kwon ............... H04W 24/08
                                                         370/252
2017/0251518 A1*  8/2017  Agiwal ............. H04W 76/28
(Continued)

FOREIGN PATENT DOCUMENTS

CN      103686781      3/2014
CN      110475326      11/2019
(Continued)

OTHER PUBLICATIONS

Japanese Office Action, Mailed Date: Jul. 24, 2023, in connection with Japanese Patent Application No. 2022-549055.
(Continued)

*Primary Examiner* — Dady Chery
(74) *Attorney, Agent, or Firm* — Eschweiler & Potashnik, LLC

(57) ABSTRACT

Techniques discussed herein can facilitate one or more enhancements to beam management for a User Equipment (UE) operating in a Discontinuous Reception (DRX) mode. A first set of techniques relates to enhancements to transmission of Scheduling Request(s) (SR(s)) by UEs operating in DRX mode. A second set of techniques relates to enhancements to beam failure detection and recovery by UEs operating in DRX mode. A third set of techniques relates to enhancements to beam measurement and reporting by UEs operating in DRX mode. Various embodiments can employ one or more techniques of the first set of techniques, the second set of techniques, and/or the third set of techniques.

20 Claims, 15 Drawing Sheets

(51) Int. Cl.
  *H04W 52/24*   (2009.01)
  *H04W 72/21*   (2023.01)
  *H04W 76/28*   (2018.01)

(58) Field of Classification Search
  CPC ... H04W 16/28; H04W 24/10; H04W 72/046; H04W 76/19; H04L 5/0023; H04L 5/005; H04L 5/0057; H04L 5/0094; H04B 7/0695; H04B 7/088; H04B 17/309
  See application file for complete search history.

(56) References Cited

U.S. PATENT DOCUMENTS

| 2018/0167883 A1* | 6/2018 | Guo | H04B 7/0617 |
| 2019/0215896 A1 | 7/2019 | Zhou et al. | |
| 2020/0036430 A1 | 1/2020 | Kim et al. | |
| 2020/0037388 A1 | 1/2020 | Nam et al. | |

FOREIGN PATENT DOCUMENTS

| EP | 3605932 A1 | 2/2020 |
| JP | 11136727 A | 5/1999 |
| WO | 2019190377 A1 | 10/2019 |
| WO | 2019216418 A1 | 11/2019 |
| WO | 2020007037 A1 | 1/2020 |
| WO | 2020013872 A1 | 1/2020 |

OTHER PUBLICATIONS

Intel Corporation; "Discussion On UL Power Control Framework"; 6.1.7.2; Discussion and Decision; R1-1712613; 3GPP TSG RAN WG1 Meeting #90; Prague, P.R. Czechia Aug. 21-25, 2017.
PCT Search Report dated Sep. 16, 2020 in connection with PCT Application No. PCT/CN2020/074916.
PCT Written Opinion dated Sep. 16, 2020 in connection with PCT Application No. PCT/CN2020/074916.
Huawei et al.; "Consideration on DRX with beam management"; 3GPP TSG-RAN WG2#99bis R2-1710563; Oct. 13, 2017; pp. 1-3.
3rd Generation Partnership Project; "Technical Specification Group Radio Access Network"; NR; Medium Access Control (MAC) protocol specification; (Release 15); 3GPP TS 38.321 V15.8.0; Dec. 2019.
5G; NR; "Physical layer procedures for data;" (3GPP TS 38.214 version 15.8.0 Release 15); ETSI TS 138 214 V15.8.0; Jan. 2020.
EP Partial Search Report dated Aug. 6, 2023 in connection with European Application No. 20918419.
EP Extended European Search Report dated Nov. 28, 2023 in connection with European Application No. 20918419.
Intel Corporation , Discussion On UL Power Control Framework [online] , 3GPP TSG RAN WG1 #90 R1-1712613 , Internet<URL:http://www.3gpp.org/ftp/tsg_ran/WG1_RL1/TSGR1_90/Docs/R1-1712613.zip>; Aug. 12, 2017.
Japanese Office Action, Mailed Date: Dec. 4, 2023, in connection with Japanese Patent Application No. 2022-549055.

* cited by examiner

BEAM MANAGEMENT ENHANCEMENT FOR DISCONTINUOUS RECEPTION (DRX) OPERATION

REFERENCE TO RELATED APPLICATIONS

This application is a National Phase entry application of International Patent Application No. PCT/CN2020/074916 filed Feb. 12, 2020, entitled "BEAM MANAGEMENT ENHANCEMENT FOR DISCONTINUOUS RECEPTION (DRX) OPERATION", the contents of which are herein incorporated by reference in their entirety.

FIELD

The present disclosure relates to wireless technology, and more specifically to techniques related to enhancing beam management for a User Equipment (UE) operating in Discontinuous Reception (DRX) mode.

BACKGROUND

The Third Generation Partnership Project (3GPP) Fifth Generation (5G) New Radio (NR) Radio Access Technology (RAT) is a newly developed air interface for 5G. 5G NR uses frequency bands in two distinct frequency ranges: Frequency Range 1 (FR1) comprising sub-6 GHz frequency bands, and Frequency Range 2 (FR2) comprising frequency bands above 6 GHz (e.g., comprising millimeter wave (mmWave), including frequency bands at 24 GHz and above).

DETAILED DESCRIPTION

Figure 1:
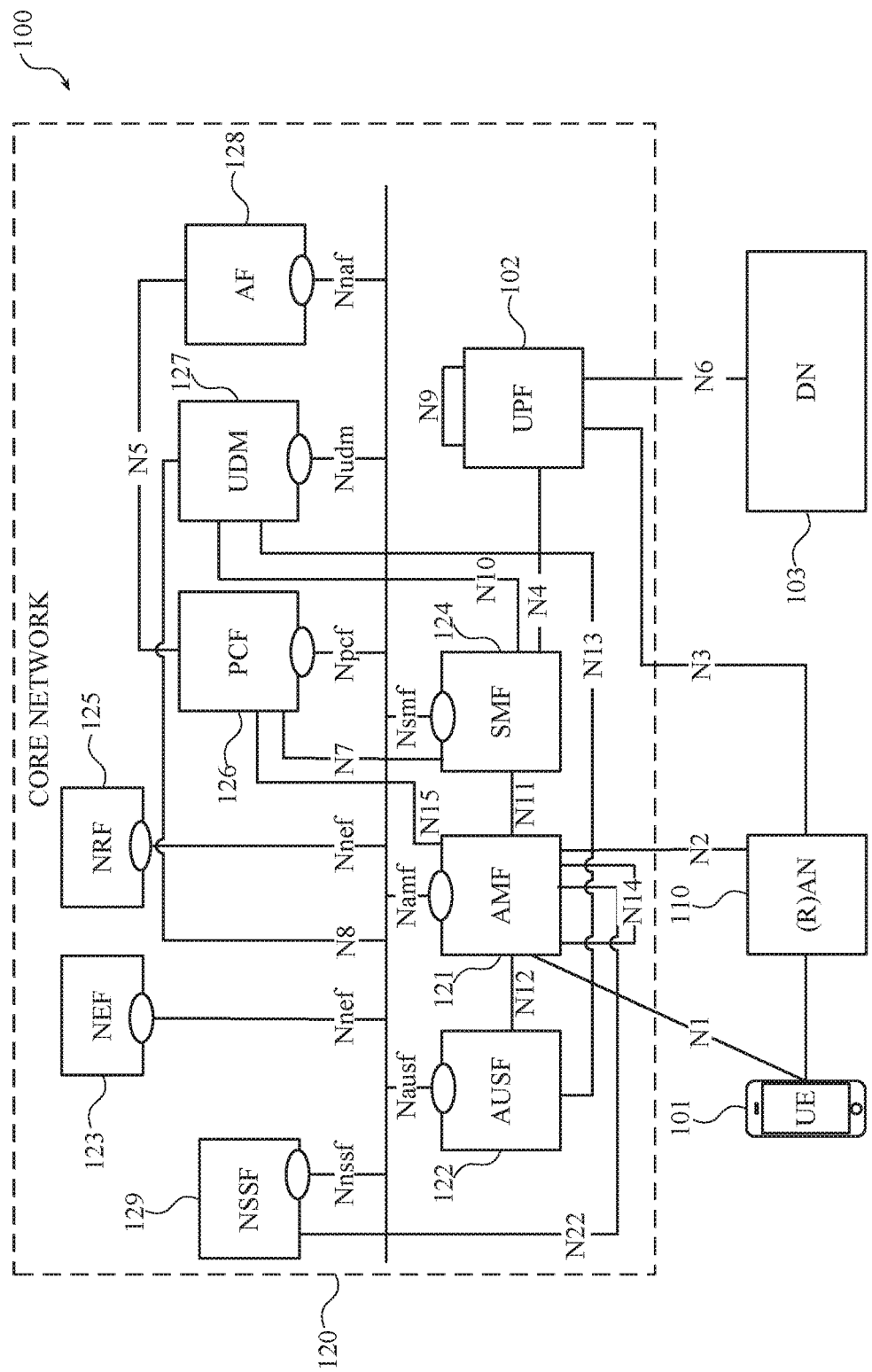
FIG. 1 is a block diagram illustrating an architecture of a system including a Core Network (CN), for example a Fifth Generation (5G) CN (5GC), in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

While FR1 overlaps with and/or shares some frequency bands employed in other RATs (e.g., Fourth Generation (4G) Long Term Evolution (LTE) bands), FR2 is a unique design feature of 5G NR, which provides multiple advantages, but also presents challenges. FR2 allows UEs to access a much higher bandwidth, which can be advantageous for services that benefit from a high data rate and/or low latency. However, FR2 suffers from increased pathloss compared to lower frequencies. To counteract this, beamforming can be employed for communication in FR2.

Because of the directional nature of beams, beam management can be performed at the UE and Radio Access Network (RAN) nodes such as next generation Node B(s) (gNB(s)). FR2 operation typically relies on analog beamforming, and as a result, for beam management, a UE will measure qualities of different beams in a Time Division Multiplexing (TDM) manner, which can consume a significant amount of resource overhead and increase latency. Additionally, the UE beam can frequently change due to various reasons. Because the beam is more directional, small rotations of the UE or environmental changes can change the optimum beam direction dramatically. Additionally, blockage of beams is more severe due to the higher frequency of FR2, which results in significantly worse penetration loss and path loss.

Additionally, FR2 operation can involve increased power consumption and thermal issues. Increased power consumption can result from baseband processing, transmission, and even AP load, due to the higher data rate possible via FR2. To offset these disadvantages, Discontinuous Transmission (DTX) and/or Discontinuous Reception (DRX) can be employed, which can essentially reduce the UE Uplink (UL) and Downlink (DL) duty cycle.

Aspects described herein can be implemented into a system using any suitably configured hardware and/or software. FIG. 1 illustrates an architecture of a system 100 including a Core Network (CN) 120, for example a Fifth Generation (5G) CN (5GC), in accordance with various embodiments. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129.

The UPF 102 can act as an anchor point for intra-RAT and inter-RAT mobility, an external Protocol Data Unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AUSF 122 can facilitate a common authentication framework for various access types. The AUSF 122 can communicate with the AMF 121 via an N12 reference point between the AMF 121 and the AUSF 122; and can communicate with the UDM 127 via an N13 reference point between the UDM 127 and the AUSF 122. Additionally, the AUSF 122 can exhibit an Nausf service-based interface.

The AMF 121 can be responsible for registration management (e.g., for registering UE 101, etc.), connection management, reachability management, mobility management, and lawful interception of AMF-related events, and access authentication and authorization. The AMF 121 can be a termination point for the an N11 reference point between the AMF 121 and the SMF 124. The AMF 121 can provide transport for SM messages between the UE 101 and the SMF 124, and act as a transparent proxy for routing SM messages. AMF 121 can also provide transport for SMS messages between UE 101 and a Short Message Service (SMS) Function (SMSF) (not shown in FIG. 1). AMF 121 can act as SEcurity Anchor Function (SEAF), which can include interaction with the AUSF 122 and the UE 101 and/or receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Single-Connection Mode (SCM) function, which receives a key from the SEA that it uses to derive access-network specific keys. Furthermore, AMF 121 can be a termination point of a RAN Control Plane (CP) interface, which can include or be an N2 reference point between the (R)AN 110 and the AMF 121; and the AMF 121 can be a termination point of Non Access Stratum (NAS) (N1) signaling, and perform NAS ciphering and integrity protection.

AMF 121 can also support NAS signaling with a UE 101 over an Non-3GPP (N3) Inter Working Function (IWF) interface. The N3IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit an Namf service-based interface, and can be a termination point for an N14 reference point between two AMFs 121 and an N17 reference point between the AMF 121 and a 5G Equipment Identity Register (5G-EIR) (not shown in FIG. 1).

The UE 101 can be registered with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 121 can store one or more RM contexts for the UE 101, where each RM context is associated with a specific access to the network. The RM context can be a data structure, database object, etc. that indicates or stores, inter alia, a registration state per access type and the periodic update timer. The AMF 121 can also store a 5GC Mobility Management (MM) context that can be the same or similar to an (Enhanced Packet System (EPS))MM ((E)MM) context. In various embodiments, the AMF 121 can store a Coverage Enhancement (CE) mode B Restriction parameter of the UE 101 in an associated MM context or RM context. The AMF 121 can also derive the value, when needed, from the UE's usage setting parameter already stored in the UE context (and/or MM/RM context).

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the AN (e.g., RRC connection or UE-N3IWF connection for non-3GPP access) and the N2 connection for the UE 101 between the AN (e.g., RAN 110) and the AMF 121. The UE 101 can operate in one of two CM states, CM-IDLE mode or CM-CONNECTED mode. When the UE 101 is operating in the CM-IDLE state/mode, the UE 101 may have no NAS signaling connection established with the AMF 121 over the N1 interface, and there can be (R)AN 110 signaling connection (e.g., N2 and/or N3 connections) for the UE 101. When the UE 101 is operating in the CM-CONNECTED state/mode, the UE 101 can have an established NAS signaling connection with the AMF 121 over the N1 interface, and there can be a (R)AN 110 signaling connection (e.g., N2 and/or N3 connections) for the UE 101. Establishment of an N2 connection between the (R)AN 110 and the AMF 121 can cause the UE 101 to transition from CM-IDLE mode to CM-CONNECTED mode, and the UE 101 can transition from the CM-CONNECTED mode to the CM-IDLE mode when N2 signaling between the (R)AN 110 and the AMF 121 is released.

The SMF 124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The SMF 124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 124 can be included in the system 100, which can be between another SMF 124 in a visited network and the SMF 124 in the home network in roaming scenarios. Additionally, the SMF 124 can exhibit the Nsmf service-based interface.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit an Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 125 can exhibit the Nnrf service-based interface.

The PCF 126 can provide policy rules to control plane function(s) to enforce them, and can also support unified policy framework to govern network behavior. The PCF 126 can also implement an FE to access subscription information relevant for policy decisions in a UDR of the UDM 127. The PCF 126 can communicate with the AMF 121 via an N15 reference point between the PCF 126 and the AMF 121, which can include a PCF 126 in a visited network and the AMF 121 in case of roaming scenarios. The PCF 126 can communicate with the AF 128 via an N5 reference point between the PCF 126 and the AF 128; and with the SMF 124 via an N7 reference point between the PCF 126 and the SMF 124. The system 100 and/or CN 120 can also include an N24 reference point between the PCF 126 (in the home network) and a PCF 126 in a visited network. Additionally, the PCF 126 can exhibit an Npcf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application Functional Entity (FE) and a Unified Data Repository (UDR) (the FE and UDR are not shown in FIG. 1). The UDR can store subscription data and policy data for the UDM 127 and the PCF 126, and/or structured data for exposure and application data (including Packet Flow Descriptions (PFDs) for application detection, application request information for multiple UEs 101) for the NEF 123. The Nudr service-based interface can be exhibited by the UDR 221 to allow the UDM 127, PCF 126, and NEF 123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 124 via an N10 reference point between the UDM 127 and the SMF 124. UDM 127 can also support SMS management, wherein an SMS-FE implements similar application logic as discussed elsewhere herein. Additionally, the UDM 127 can exhibit the Nudm service-based interface.

The AF 128 can provide application influence on traffic routing, provide access to NEF 123, and interact with the policy framework for policy control. 5GC 120 and AF 128 can provide information to each other via NEF 123, which can be used for edge computing implementations. In such implementations, the network operator and third party services can be hosted close to the UE 101 access point of attachment to achieve an efficient service delivery through the reduced end-to-end latency and load on the transport network. For edge computing implementations, the 5GC can select a UPF 102 close to the UE 101 and execute traffic steering from the UPF 102 to DN 103 via the N6 interface. This can be based on the UE subscription data, UE location, and information provided by the AF 128. In this way, the AF 128 can influence UPF (re)selection and traffic routing. Based on operator deployment, when AF 128 is considered to be a trusted entity, the network operator can permit AF 128 to interact directly with relevant NFs. Additionally, the AF 128 can exhibit an Naf service-based interface.

The NSSF 129 can select a set of network slice instances serving the UE 101. The NSSF 129 can also determine allowed Network Slice Selection Assistance Information (NSSAI) and the mapping to the subscribed Single NSSAIs (S-NSSAIs), as appropriate. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N22 reference point between AMF 121 and NSSF 129; and can communicate with another NSSF 129 in a visited network via an N31 reference point (not shown in FIG. 1). Additionally, the NSSF 129 can exhibit an Nnssf service-based interface.

As discussed previously, the CN 120 can include an SMSF, which can be responsible for SMS subscription checking and verification, and relaying SM messages to/from the UE 101 to/from other entities, such as an SMS-Gateway Mobile services Switching Center (GMSC)/Inter-Working MSC (IWMSC)/SMS-router. The SMSF can also interact with AMF 121 and UDM 127 for a notification procedure that the UE 101 is available for SMS transfer (e.g., set a UE not reachable flag, and notifying UDM 127 when UE 101 is available for SMS).

The CN 120 can also include other elements that are not shown in FIG. 1, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 1 for clarity. In one example, the CN 120 can include an Nx interface, which is an inter-CN interface between the MME (e.g., a non-5G MME) and the AMF 121 in order to enable interworking between CN 120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 2:
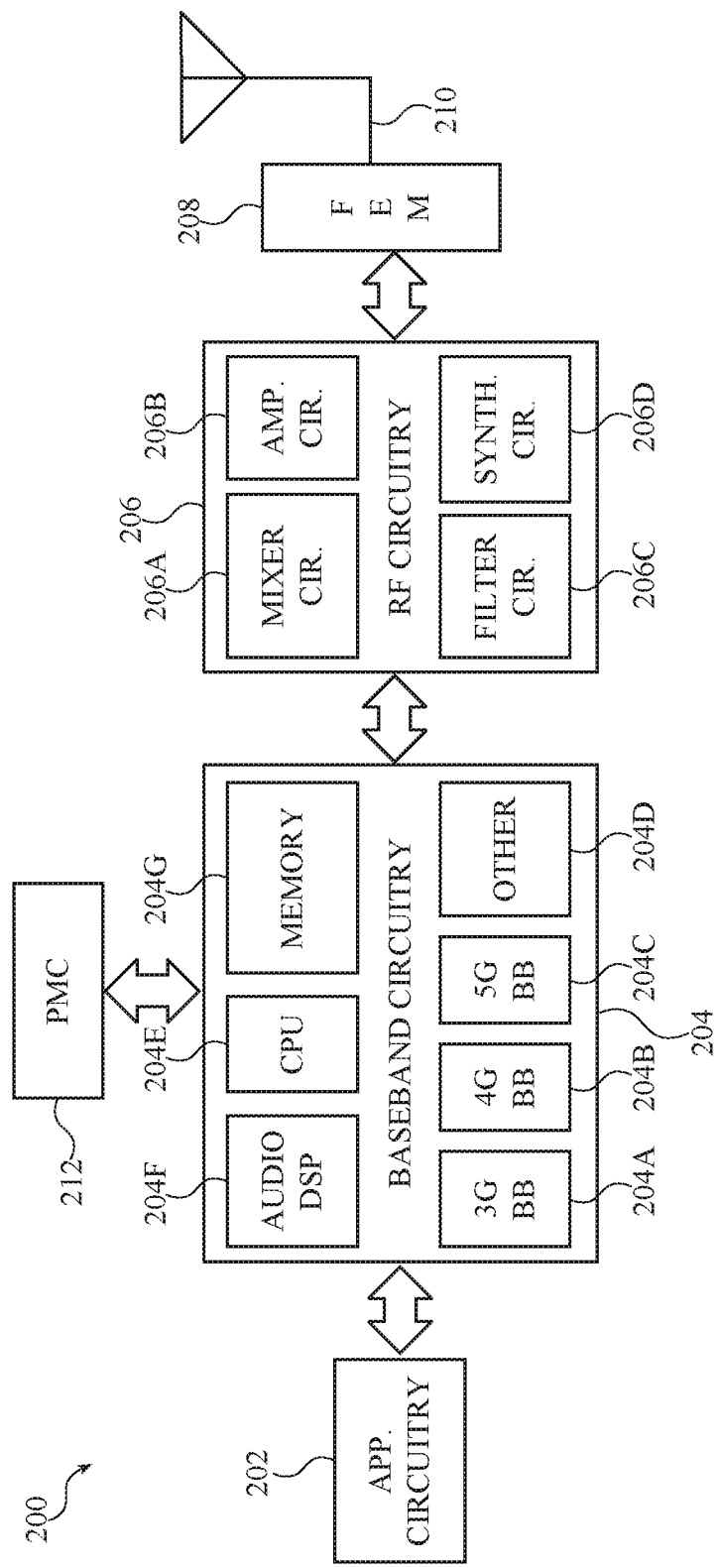
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some embodiments, the device 200 can include fewer elements (e.g., a RAN node may not utilize application circuitry 202, and instead include a processor/controller to process IP data received from a CN such as 5GC 120 or an Evolved Packet Core (EPC)). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
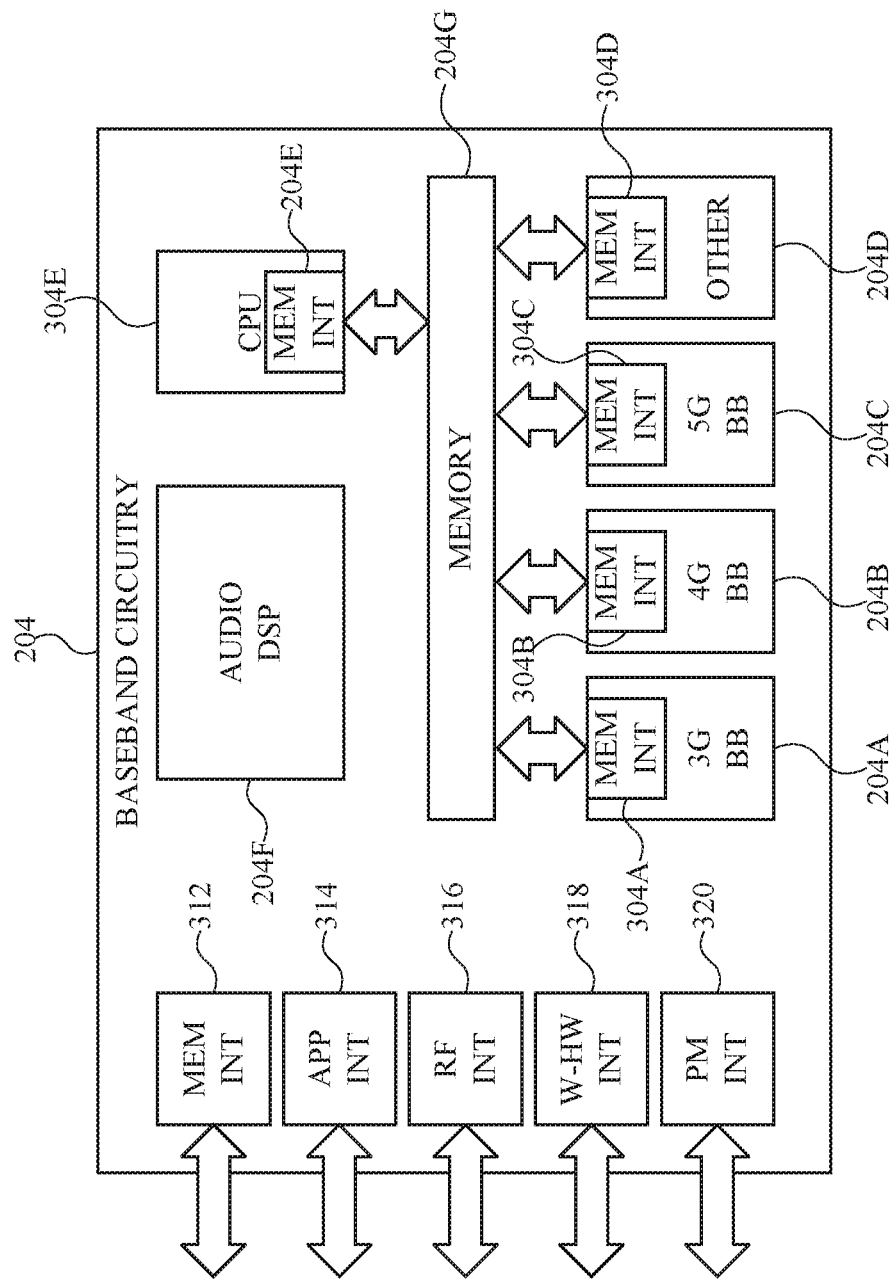
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

In various aspects, embodiments discussed herein can facilitate beam management for a UE operating in DRX via one or more of a variety of techniques discussed herein.

As discussed above, FR2 operation can involve beam management in connection with the analog beamforming employed for transmission and reception in FR2. Because of the increased data rate of FR2, operation in FR2 can increase power consumption and thermal issues. Although DRX operation can mitigate concerns with power consumption and thermal issues, there is a conflict between a long DRX cycle and reliable beam management. For power saving, it can be beneficial to configure a long DRX cycle. However, a long DRX cycle can, at least in existing systems, result in the UE performing beam management less frequently, which can reduce beam quality and reliability.

To address these issues, various embodiments can employ one or more techniques discussed herein that can facilitate enhanced beam management for DRX operation of a UE. Although various techniques discussed herein can be employed in connection with a long or short DRX cycle to provide advantages over existing approaches, some of these techniques can provide even more significant advantages over existing approaches when employed in connection with a long DRX cycle as compared with a long DRX cycle of existing system. Various embodiments can employ any of a variety of techniques discussed herein, including in various combinations. These techniques are grouped herein into three related sets of techniques related to (1) Scheduling Request (SR) transmission and beam sweep, (2) beam failure recovery enhancement, and (3) bursty beam measurement and reporting enhancement.

A first set of techniques discussed herein relates to enhancements associated with transmission of Scheduling Request(s) (SR(s)) by UEs operating in DRX mode. A second set of techniques discussed herein relates to enhancements associated with beam failure detection and recovery by UEs operating in DRX mode. A third set of techniques discussed herein relates to enhancements associated with beam measurement and reporting by UEs operating in DRX mode. Various embodiments can employ one or more techniques of the first set of techniques, the second set of techniques, and/or the third set of techniques.

Figure 4:
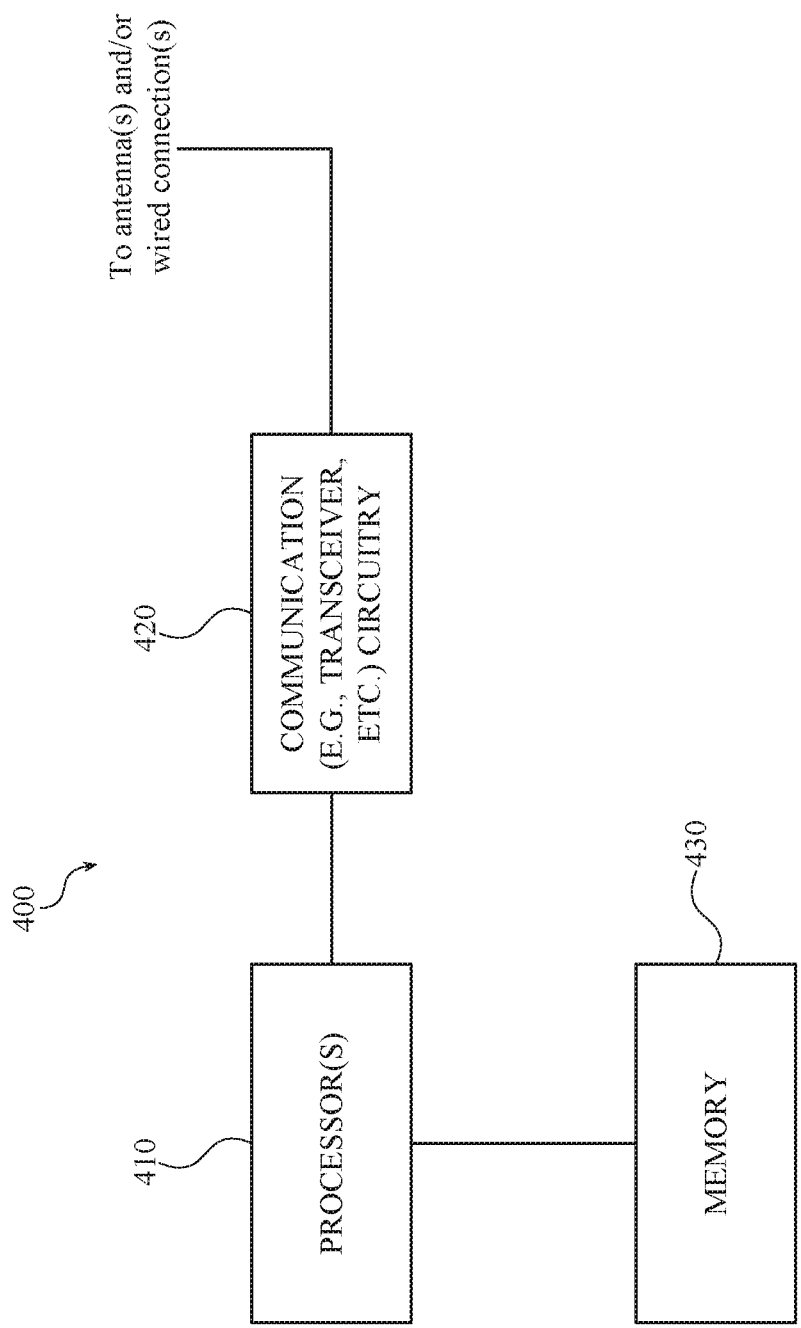
FIG. 4 is a block diagram illustrating a system that facilitates one or more enhancements to beam management in connection with Discontinuous Reception (DRX) operation of a UE, according to various embodiments discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates one or more enhancements to beam management in connection with Discontinuous Reception (DRX) operation of a UE, according to various embodiments discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of embodiments of system 400 (e.g., UE embodiments) can be indicated via subscripts (e.g., system $400_{UE}$ comprising processor(s) $410_{UE}$, communication circuitry $420_{UE}$, and memory $430_{UE}$). In some embodiments, such as BS embodiments (e.g., system $400_{gNB}$) and network component (e.g., UPF (User Plane Function), etc.) embodiments (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In embodiments, signaling or messaging between different embodiments of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects discussed herein, signals and/or messages can be generated and output for transmission, and/or transmitted messages can be received and processed. Depending on the type of signal or message generated, outputting for transmission (e.g., by processor(s) 410, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping to one or more Resource Elements (REs) (e.g., a scheduled set of resources, a set of time and frequency resources granted for uplink transmission, etc.), wherein each RE can span one subcarrier in a frequency domain and one symbol in a time domain (e.g., wherein the symbol can be according to any of a variety of access schemes, e.g., Orthogonal Frequency Division Multiplexing (OFDM), Single Carrier Frequency Division Multiple Access (SC-FDMA), etc.). Depending on the type of received signal or message, processing (e.g., by processor(s) 410, etc.) can comprise one or more of: identifying physical resources associated with the signal/message, detecting the signal/message, resource element group deinterleaving, demodulation, descrambling, and/or decoding.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., and the type of signaling employed, the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Various embodiments relate to enhancements to the operation of one or more of a UE and/or a node of a 3GPP RAN (e.g., a gNB) in connection with beam management of the UE during DRX operation. Briefly, a UE in DRX mode can operate (e.g., via a Medium Access Control (MAC) entity of the UE, e.g., as implemented by processors $410_{UE}$, etc.) according to a DRX cycle (e.g., the long DRX cycle or the short DRX cycle) that can allow for discontinuous monitoring of PDCCH, etc., which can provide for reduced power consumption. DRX operation can be controlled and/or configured via Radio Resource Control (RRC) by configuring a number of parameters associated with DRX operation (e.g., via RRC signaling generated by processor(s) $410_{gNB}$, transmitted by communication circuitry $420_{gNB}$, received by communication circuitry $420_{UE}$, and processed by processor(s) $410_{UE}$). These parameters can comprise parameters related to: a DRX on duration timer (e.g., via the drx-onDurationTimer parameter), a DRX inactivity timer (e.g., via the drx-InactivityTimer), start of a DRX cycle (e.g., via the drx-LongCycleStartOffset), optional parameters related to a short DRX cycle (e.g., drx-ShortCycle and drx-ShortCycleTimer). Various embodiments can relate to operations (e.g., by a UE and/or gNB) during a DRX cycle (e.g., long or short), including but not limited to operations during and/or prior to a DRX on duration, and operations related to actions taken in connection with the DRX on duration timer and/or DRX inactivity timer.

Techniques Related to Scheduling Request (SR) Transmission with Beam Sweep

The first set of techniques comprise techniques related to transmission of a Scheduling Request (SR) by a UE (e.g., employing a system $400_{UE}$, etc.) operating in DRX mode relative to one or more cells (e.g., a Primary Cell (PCell), and optionally a Primary Secondary Cell (PSCell), alone, or in addition to one or more other SCells) from one or more gNBs (e.g., employing a system $400_{gNB}$, etc.).

In various embodiments, a UE (e.g., that has UL data to transmit for which the UE does not yet have an associated Physical Uplink Shared Channel (PUSCH) grant) can transmit a SR (e.g., generated by processor(s) $410_{UE}$, transmitted by communication circuitry $420_{UE}$, received by communication circuitry $420_{gNB}$, and processed by processor(s) $410_{gNB}$) on a selected beam during a DRX on duration of a DRX cycle (e.g., long or short) of the UE. In various embodiments, the selected beam can be a best beam of one or more candidate beams, which can be determined as discussed herein, based on one or more of Channel State Information Reference Signal(s) (CSI-RS) and/or Synchronization Signal Block(s) (SSB(s)) transmitted by the gNB (e.g., generated by processor(s) $410_{gNB}$, transmitted by communication circuitry $420_{gNB}$, received by communication circuitry $420_{UE}$, and processed by processor(s) $410_{UE}$). Alternatively, in other embodiments, the selected beam can be a previously employed beam, which can have been, for example, previously determined (e.g., during or prior to an earlier DRX on duration) to be a best beam (e.g., as discussed herein).

Additionally, in various embodiments, SSB and/or CSI-RS can be configured for the UE for each DRX on duration (or each N DRX on durations, wherein N is a positive integer; e.g., some embodiments can have N>1, such as in connection with a short DRX cycle, etc.) for each of a plurality of beams for the UE to check beam quality of those beams. For one or more of these beams (e.g. for each beam of the plurality of beams for which the UE detected SSB and/or CSI-RS), the UE can measure (e.g., via processor(s) $410_{UE}$ and/or communication circuitry $420_{UE}$) an associated beam quality metric (e.g., Reference Signal Received Power (RSRP), Reference Signal Received Quality (RSRQ), Signal-to-Interference-plus-Noise Ratio (SINR), etc.) based on the signaling (e.g., SSB and/or CSI-RS) for that beam. In various embodiments, based on the associated beam quality metrics for the one or more beams, the UE can select a best beam among the one or more measured beams based on the associated beam quality metrics. Alternatively, in some embodiments, the UE can select a previously used beam (e.g., one selected as a best beam one or more DRX cycles previously, etc.), and in some such embodiments, the UE can ignore the SSB and/or CSI-RS, further minimizing power consumption.

In some embodiments, the SSB and/or CSI-RS can be during the DRX on duration, while in other embodiments they can be outside the DRX on duration of the UE. In various embodiments wherein the SSB and/or CSI-RS are outside the DRX on duration of the UE, they can be configured immediately prior to (e.g., in one or more slot(s) immediately prior to) the start of the DRX on duration of the UE, which can minimize power consumption at the UE.

In various embodiments, one or more sets of PUCCH resources can be configured to the UE for transmission of the SR, and each of the configured PUCCH resources can have a fixed mapping to one or more of the SSB and/or CSI-RS (and, equivalently, to the one or more gNB beams over which those one or more SSB and/or CSI-RS were transmitted). Thus, once the UE selects (e.g., via processor(s) $410_{UE}$) the beam for transmission, the UE can determine (e.g., via processor(s) $410_{UE}$) from that beam selection which PUCCH resources to employ for SR transmission. In some embodiments, the mapping between PUCCH and SSB/CSI-RS can be one to one, wherein each SSB/CSI-RS is configured with distinct PUCCH resources. In other embodiments, the mapping between PUCCH and SSB/CSI-RS can be many to one, wherein multiple SSB/CSI-RS are configured with the same PUCCH resource (e.g., for four SSB/CSI-RS, a single PUCCH resource can be configured for all four SSB/CSI-RS, or two PUCCH resources can be configured, each of which is for two different SSB/CSI-RS, etc.). Additionally, in some embodiments, a previously selected beam can be associated with configured dedicated PUCCH resources for that previously selected beam (e.g., in embodiments employing one-to-one mapping, or in embodiments employing many-to-one mapping for one or more PUCCH resources). This can further minimize UE power consumption, giving the option for the UE to omit SSB/CSI-RS measurement, or SSB/CSI-RS measurement for other beams (e.g., while still measuring the previously selected beam to determine if its beam quality metric is sufficient).

In various embodiments wherein the UE is configured with multiple PUCCH for SR transmission, each of the multiple PUCCH can be associated with a distinct beam of the plurality of beams. Thus, once the UE selects a beam (e.g., the best beam, via techniques described herein) for SR transmission, the UE (e.g., via processor(s) $410_{UE}$) can determine the associated PUCCH resources.

In various embodiments (e.g., those with more than one PUCCH resource), the mapping of PUCCH resources to SSB/CSI-RS can be previously configured for the UE at some time prior to transmission of the SSB/CSI-RS (e.g., prior to the DRX on duration, etc.). In embodiments wherein PUCCH resources are dedicated for a previously selected beam, these dedicated PUCCH resources can also be previously configured (e.g., at the same time). Additionally, in various embodiments, a threshold can be configured for the associated beam quality metric such that transmission of the SR by the UE can depend on the beam selected by the UE (e.g., best beam, a previously selected beam, a first qualifying beam, etc.) having an associated beam quality metric greater than or equal to the configured threshold, which can thereby reduce latency. Additionally, in some embodiments employing a configured threshold for the associated beam quality metric, the UE can optionally omit later measurements once at least one beam has been found to have an associated beam quality metric that meets the threshold, which can reduce power consumption.

For SR/PUCCH power control, UE pathloss estimates (e.g., determined by processor(s) $410_{UE}$ and communication circuitry $420_{UE}$) are determined from the Reference Signal(s) (RS(s)) or Synchronization Signal(s) (SS(s)) used for detecting the selected (e.g., best) beam and the receive beam used for receiving the selected beam. In various embodiments, a minimum number of samples or measurement duration(s) can be configured for the UE, in order to ensure the UE can obtain a reliable path loss estimate for power control. In scenarios wherein there is a sufficient number of samples or measurement duration(s) for a selected (e.g., best) beam, the UE can use the PUCCH resources for the selected beam to transmit the SR, with transmit power determined by the UE based on the estimated path loss. In scenarios wherein there is an insufficient number of samples or measurement duration(s) for a selected (e.g., best) beam, in some embodiments, the UE can use the selected beam for SR transmission and use a transmit power based on a previously determined pathloss for the selected beam. Alternately, in other embodiments, in such scenarios the UE can use a different beam for SR transmission (e.g., via PUCCH resources associated with that different beam) for which pathloss can be accurately estimated.

After transmission of the SR via appropriate PUCCH resources, the UE can employ the beam used for SR transmission to monitor for and/or receive via Physical Downlink Control Channel (PDCCH) (e.g., including for Downlink Control Information (DCI) indicating an UL grant in response to the SR) or Physical Downlink Shared Channel (PDSCH), and/or to transmit via Physical Uplink Control Channel (PUCCH) or Physical Uplink Shared Channel (PUSCH).

Figure 5:
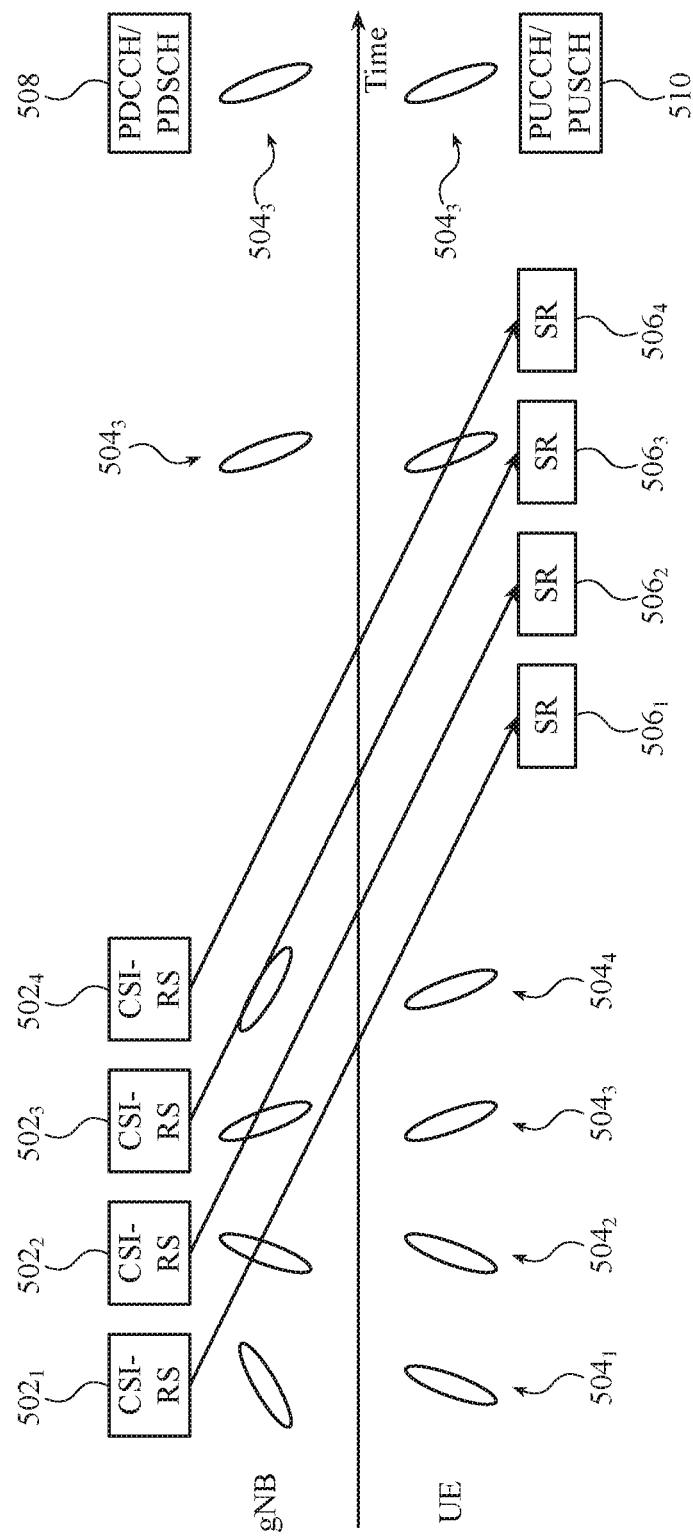
FIG. 5 is an example timing diagram of an example scenario that can be employed to facilitate SR transmission of a UE operating in DRX mode, according to various embodiments discussed herein.

Referring to FIG. 5, illustrated is an example timing diagram of an example scenario that can be employed to facilitate SR transmission of a UE operating in DRX mode, according to various embodiments discussed herein. FIG. 5 illustrates an example scenario implementing one or more techniques discussed in connection with the first set of techniques, although it is to be appreciated that other techniques can be implemented and/or the same techniques can be implemented in different scenarios. FIG. 5 shows CSI-RS $502_i$ transmitted in a TDM manner (e.g., with each distinct set of CSI-RS transmitted a different time) from a gNB to a UE (e.g., wherein the CSI-RS (which could also be SSB in other scenarios) is generated by processor(s) $410_{gNB}$, transmitted by communication circuitry $420_{gNB}$, received by communication circuitry $420_{UE}$, and processed by processor(s) $410_{UE}$) over a plurality of beam pairs $504_i$ (each comprising a gNB beam used for CSI-RS transmit (Tx) and a UE beam used for CSI-RS receive (Rx)). In the example of FIG. 5, distinct resources $506_i$ are configured for each beam pair $504_i$ to generate a SR (e.g., during a DRX on duration of the UE) over the UE beam of that beam pair, although this can vary in embodiments. In the example of FIG. 5, the UE has selected the third beam pair (5043) as the best beam, and transmitted the scheduling request over the UE beam of beam pair 5043 (e.g., wherein the SR is generated by processor(s) $410_{UE}$, transmitted by communication circuitry $420_{UE}$, received by communication circuitry $420_{gNB}$, and processed by processor(s) $410_{gNB}$). Afterwards, the UE can employ the UE beam over which the SR was transmitted (e.g., the UE beam of beam pair 5043 in the example of FIG. 5) to monitor for and/or receive via PDCCH (e.g., monitor for DCI indicating a UL grant in response to the SR, etc.)/PDSCH 508 and/or transmit via PUCCH/PUSCH 510.

Figure 6:
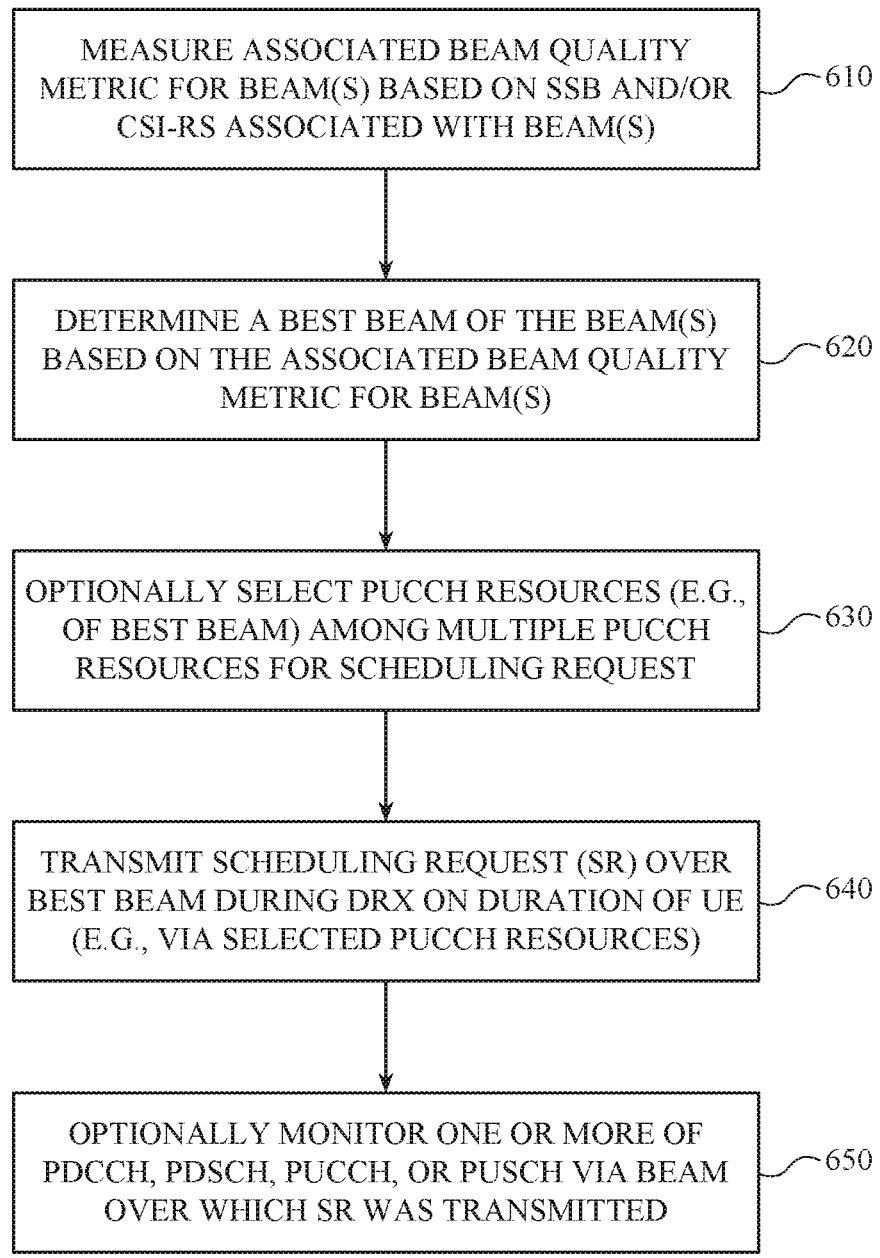
FIG. 6 is a flow diagram of an example method employable at a UE that facilitates Scheduling Request (SR) transmission by the UE when operating in Discontinuous Reception (DRX) mode, according to various embodiments discussed herein.

Referring to FIG. 6, illustrated is a flow diagram of an example method employable at a UE that facilitates Scheduling Request (SR) transmission by the UE when operating in Discontinuous Reception (DRX) mode, according to various embodiments discussed herein. In other aspects, a machine readable medium can store instructions associated with method 600 that, when executed, can cause a UE (e.g., employing system $400_{UE}$) to perform the acts of method 600.

At 610, an associated beam quality metric (e.g., RSRP, RSRQ, SINR, etc.) can be measured for each beam of one or more beams based on signaling (e.g., SSB and/or CSI-RS) transmitted over that beam. In various embodiments, the signaling can be transmitted during a DRX on duration of the UE or before (e.g., immediately prior to) the DRX on duration of the UE.

At 620, based on the associated beam quality metric, a selected (e.g., best) beam can be determined (e.g., the beam with the highest determined beam quality metric (e.g., RSRP, etc.), a previously determined or other beam with sufficient beam quality metric, etc.).

Optionally, at 630, a PUCCH resource associated with the selected (e.g., best) beam (e.g., mapped to the signaling received over the selected beam) can be selected from multiple PUCCH resources for a SR transmission (e.g., a PUCCH resource uniquely associated with the selected beam, or associated with the selected beam and one or more other beams). In other embodiments, a many-to-one mapping can be employed which may provide a single PUCCH resource rendering this selection unnecessary.

At 640, the SR can be transmitted over the selected (e.g, best) beam during the DRX on duration of the UE. In some embodiments, transmission of the SR over the selected (e.g., best) beam can depend on the associated beam quality metric for the selected (e.g., best) beam meeting or exceeding a threshold. In various embodiments, the transmit power for the SR can be based on an estimated pathloss for the selected beam if there is sufficient information to measure that pathloss. If there is not, in some embodiments, a previously estimated pathloss for that beam can be used for transmit power determination. In other embodiments, if a first choice for selected beam does not have sufficient information to determine pathloss, a different beam can be selected at 620 for which sufficient information is available.

Optionally, at 650, one or more of PDCCH/PDSCH can be monitored/received and/or PUCCH/PUSCH can be transmitted over the selected beam used for SR transmission. This can include, for example, monitoring according to an active time of the UE (e.g., based on DRX on duration and/or inactivity duration timer(s)), such as for DCI indicating a UL grant in response to the SR, transmitting PUSCH via a UL grant, etc.

Additionally or alternatively, method 600 can include one or more other acts described herein in connection with various embodiments of a UE and/or system $400_{UE}$ and the first set of techniques.

Figure 7:
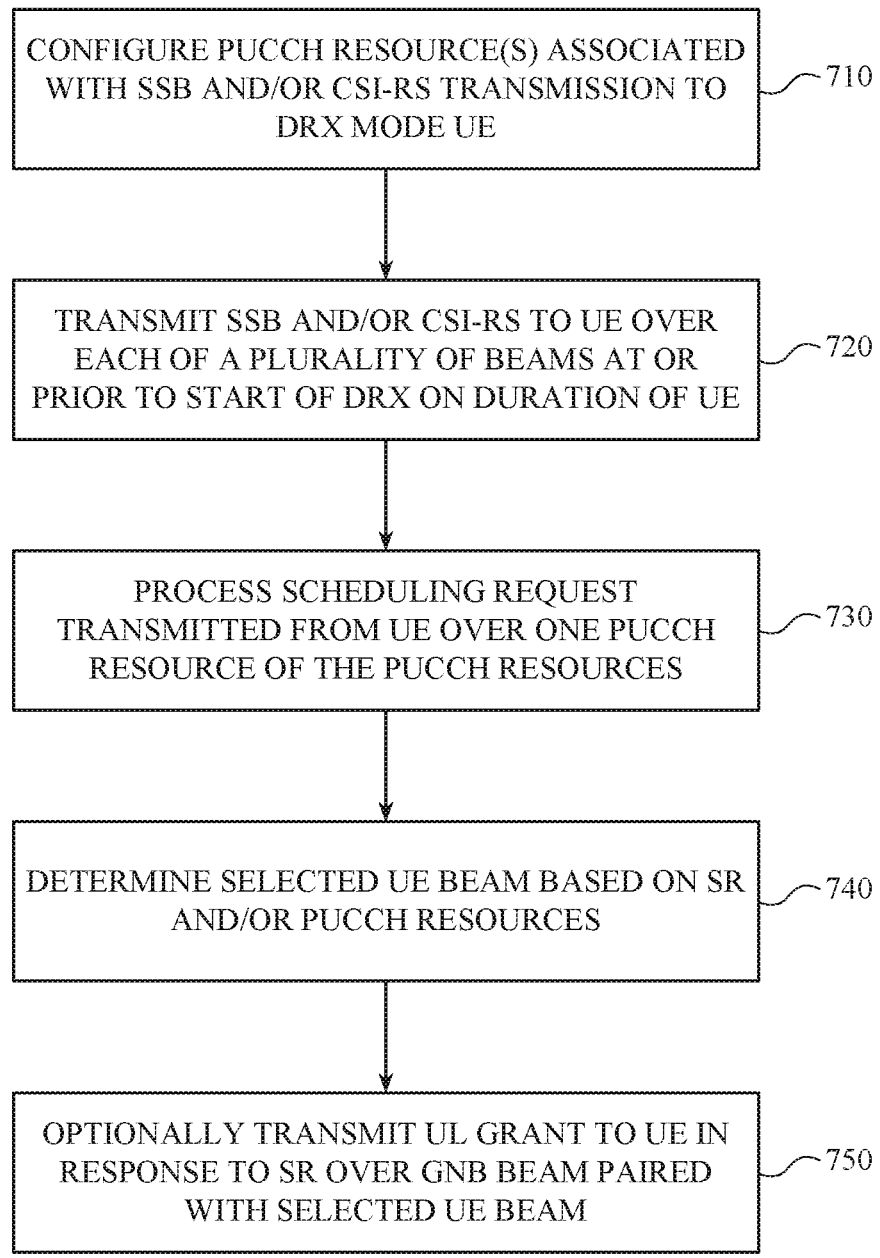
FIG. 7 is a flow diagram of an example method employable at a gNB that facilitates Scheduling Request (SR) transmission at a UE operating in Discontinuous Reception (DRX) mode, according to various embodiments discussed herein.

Referring to FIG. 7, illustrated is a flow diagram of an example method employable at a gNB that facilitates Scheduling Request (SR) transmission at a UE operating in Discontinuous Reception (DRX) mode, according to various embodiments discussed herein. In other aspects, a machine readable medium can store instructions associated with method 700 that, when executed, can cause a gNB (e.g., employing system $400_{gNB}$) to perform the acts of method 700.

At 710, one or more PUCCH resources can be configured to a UE that can be used to generate a SR. The PUCCH resources can be associated in a one-to-one or many-to-one with as plurality of SSB and/or CSI-RS to be transmitted to the UE for beam selection.

At 720, SSB and/or CSI-RS can be transmitted over a plurality of beams in a TDM manner at the start of or prior to (e.g., immediately prior to) a DRX on duration of the UE.

At 730, a scheduling request can be received from the UE requesting a UL grant. The scheduling request can be transmitted over a selected beam of the UE for further communication (e.g., PDCCH/PDSCH/PUCCH/PUSCH, etc.). Additionally, in various embodiments, the PUCCH resource employed for transmission of the beam can be associated with one or more of the SSB and/or CSI-RS transmitted at 720.

At 740, the selected beam of the UE can be determined based on the SR and/or PUCCH resource.

Optionally, at 750, a UL grant can be transmitted to the UE in response to the SR over a gNB beam corresponding to the selected beam of the UE, allocating PUSCH resources for UL data.

Additionally or alternatively, method 700 can include one or more other acts described herein in connection with various embodiments of a gNB and/or system 400$_{gNB}$ and the first set of techniques.

Techniques Related to Beam Failure Detection and Recovery

The second set of techniques comprise techniques related to beam failure detection and recovery by a UE operating in DRX mode relative to one or more cells (e.g., a PCell, and optionally a PSCell, alone, or in addition to one or more other SCells) from one or more gNBs (e.g., employing a system 400$_{gNB}$, etc.). In various embodiments of the second set of techniques, except as otherwise specified, each beam can be handled separately, whereby techniques discussed herein can be separately applied by a UE and/or gNB in connection with one or more beams.

Figure 8:
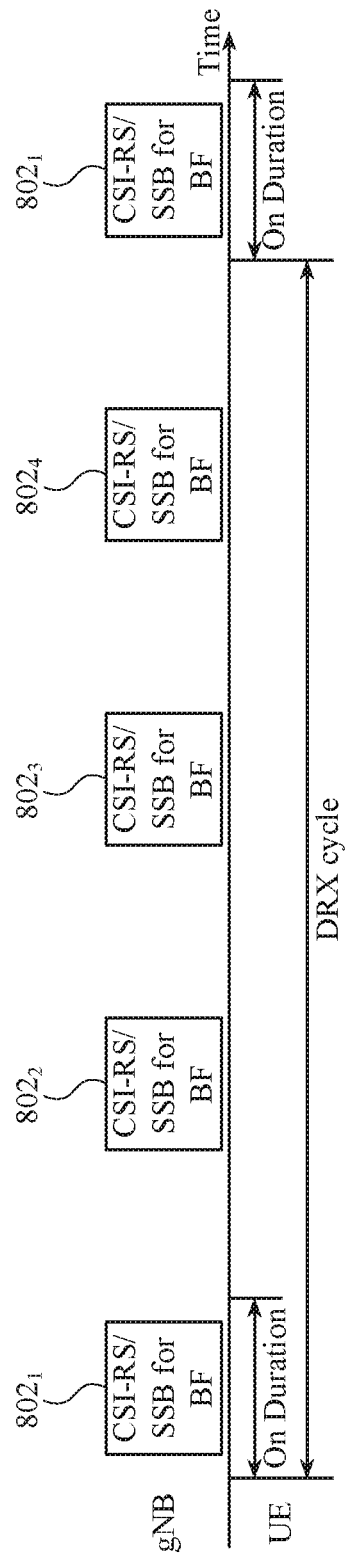
FIG. 8 is an example timing diagram showing a plurality of CSI-RS and/or SSB $802_i$ configured for BF detection by a DRX mode UE, according to various embodiments discussed herein.

In various embodiments, signaling (e.g., SSB and/or CSI-RS) can be configured for a UE to detect beam failure (BF) on a given beam during a DRX cycle (e.g., long or short) of that UE. The signaling configured for BF can be comprise signaling within a DRX on duration of the UE. Additionally, in various embodiments (e.g., in connection with a DRX cycle greater than or equal to a threshold duration, e.g., 320 ms), the signaling configured for BF can also comprise signaling outside of the DRX on duration of the UE. In various embodiments, the UE can measure the signaling for BF during the DRX on duration, and can optionally measure none, some, or all of the signaling for BF outside the DRX on duration (e.g., wherein more measurements can provide more accurate determination, but increased power consumption), which can depend on UE ability to meet a minimum performance level for the beam. Referring to FIG. 8, illustrated is an example timing diagram showing a plurality of CSI-RS and/or SSB 802$_i$ configured for BF detection by a DRX mode UE, according to various embodiments discussed herein. In the example scenario shown in FIG. 8, four sets of signaling for BF detection/recovery 802$_1$-802$_4$ are configured during each DRX cycle of the UE, one of which (802$_1$) is during the DRX on duration of the UE. The number of times signaling for BF is configured during a DRX cycle can be greater or fewer in various embodiments.

Additionally, during the DRX on duration, UL resources can be configured that can be used for reporting beam failure by the UE (e.g., for transmission of a BF recovery request generated by processor(s) 410$_{UE}$, transmitted by communication circuitry 420$_{UE}$, received by communication circuitry 420$_{gNB}$, and processed by processor(s) 410$_{gNB}$). The nature of these resources can vary based on the type of cell associated with the given beam. For example, for a PCell or PSCell, contention based Physical Random Access Channel (PRACH) or contention free PRACH can be configured for the UE to report BF. In some embodiments, distinct PRACH can be configured for each beam in a one-to-one manner, while in other embodiments, a many-to-one mapping can be employed, which can be, for example, the same mapping employed between SSB/CSI-RS and PUCCH as discussed above in connection with the first set of techniques (e.g., related to candidate beam detection and selection). For an SCell, the configured resources for BF reporting and/or recovery can comprise PUCCH/SR resources, or can comprise a UL PUSCH grant.

Additionally, if beam failure is detected by the UE and/or beam failure recovery is requested, the operation of one or more DRX timers (e.g., DRX on duration timer, DRX inactivity timer) can be affected. For example, in various embodiments, if beam failure is detected, the DRX on duration timer and/or DRX inactivity timer can be stopped if active. In various embodiments, the one or more DRX timers can be paused when BF is detected and a BF recovery request is going to be transmitted. Additionally, in some embodiments, the one or more DRX timers can optionally also be reset to 0 (in others, they can be maintained paused at a current value). During BF recovery (e.g., after transmission of a BF recovery request and while awaiting a BF recovery response from the gNB, etc.), the one or more DRX timers can remain stopped. After the UE receives a BF recovery request response from the network successfully (e.g., wherein the response can be generated by processor(s) 410$_{gNB}$, transmitted by communication circuitry 420$_{gNB}$, received by communication circuitry 420$_{UE}$, and processed by processor(s) 410$_{UE}$), the UE can restart and/or reset (e.g., via processor(s) 410$_{UE}$) the one or more DRX timers (e.g., DRX on duration timer, DRX inactivity timer).

Figure 9:
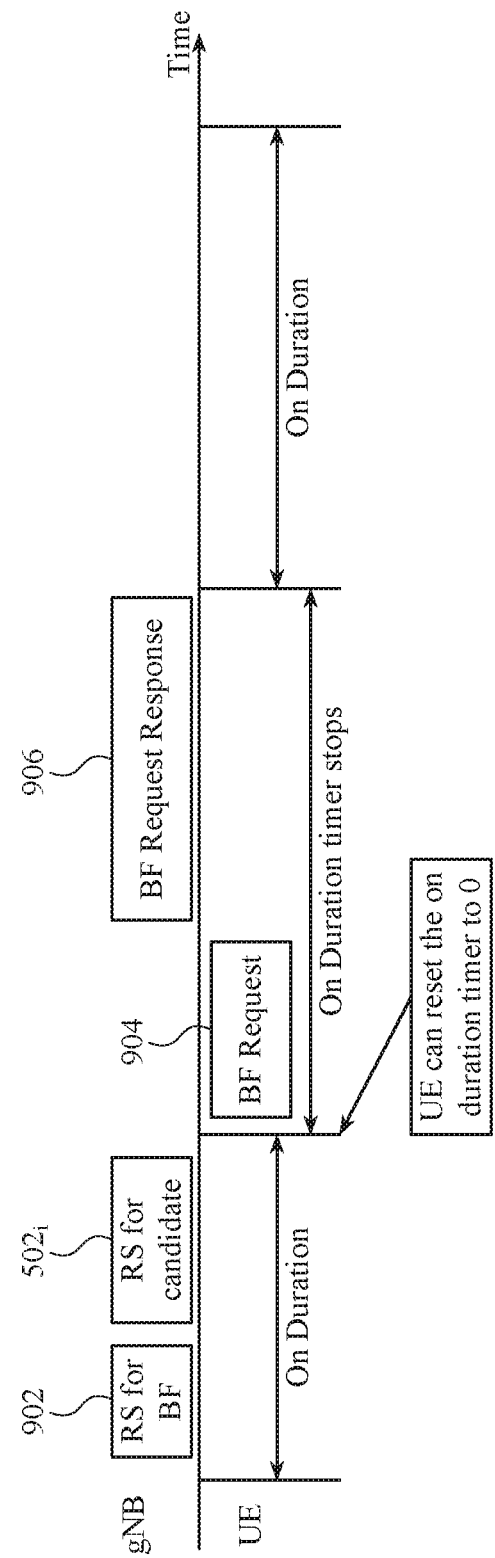
FIG. 9 is an example timing diagram showing operation of a DRX on duration timer in connection with aspects of the second set of techniques, according to various embodiments discussed herein.

Referring to FIG. 9, illustrated is an example timing diagram showing operation of a DRX on duration timer in connection with aspects of the second set of techniques, according to various embodiments discussed herein. At 902, signaling for BF detection can be transmitted by the gNB (which, in various embodiments, can be prior to signaling 502$_i$ for candidate beam selection, discussed in connection with the first set of techniques, above). If BF is detected, the UE can pause an active DRX on duration timer (e.g., pause at a current value), or can alternatively reset the DRX on duration timer to 0 (as noted at the bottom of FIG. 9). At 904, the UE can transmit a BF recovery request, and can keep the DRX on duration timer stopped until the UE receives a response to the BF recovery request at 906, at which point the UE can restart the DRX on duration timer.

If, alternatively, BF recovery is unsuccessful, the at least one DRX timer (e.g., DRX on duration timer, etc.) can be expired, and the UE can enter a sleep state. In such a situation, the UE can wake up on the next DRX on duration and attempt BF recovery again.

For a UE operating in Carrier Aggregation (CA) mode, if the given beam is a beam of a SCell, in some embodiments, BF can be treated the same as on a PCell or PSCell. In other embodiments, however, one or more of the above techniques can be varied for a beam of a SCell. For example, in some embodiments, BF of a SCell can have no impact on the one or more DRX timers. In such embodiments, if the UE transmits a SR for a PUSCH grant to transmit the BF recovery request but does not receive a response from the gNB before the DRX on duration timer expires, the UE can enter a sleep state and re-attempt BF recovery during a next DRX on duration. Additionally, in such embodiments, the UE can receive a UL PUSCH grant for BF recovery, and can transmit a Medium Access Control (MAC) Control Element (MAC-CE) (e.g., generated by processor(s) 410$_{UE}$, transmitted by communication circuitry 420$_{UE}$, received by communication circuitry 420$_{gNB}$, and processed by processor(s) 410$_{gNB}$) for BF recovery, but not receive an Acknowledgment (ACK)/Negative Acknowledgment (NACK) (e.g., DCI that schedules the same UL Hybrid Automatic Repeat reQuest (HARQ) processing Identifier (ID) with NDI flipped) before one or more DRX timers expire. In such scenarios, depending on the embodiment, the one or more DRX timers (e.g., DRX on duration timer, DRX inactivity timer) can be extended, or the UE can enter a sleep state and re-attempt BF recovery during a next DRX on duration.

Figure 10:
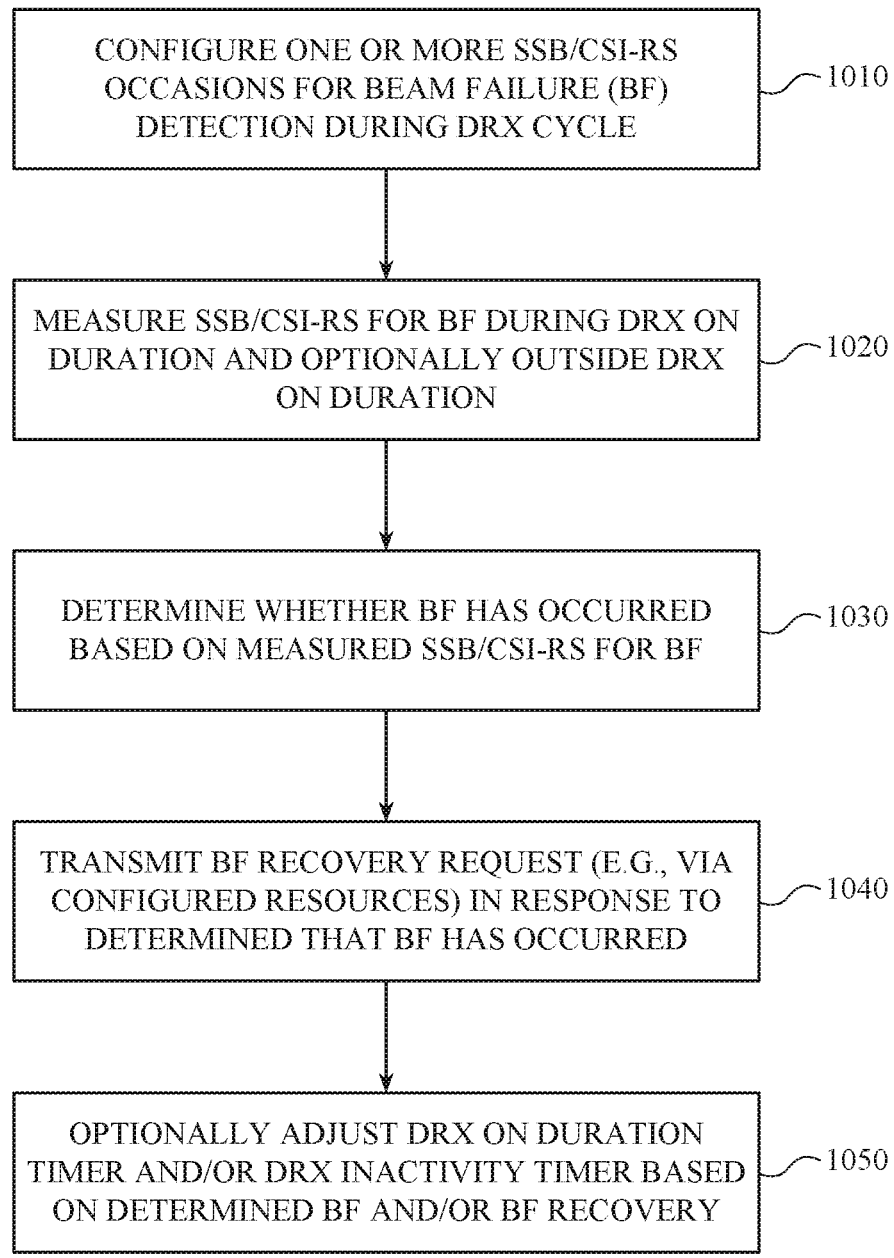
FIG. 10 is a flow diagram of an example method employable at a UE that facilitates Beam Failure (BF) detection and recovery by the UE when operating in Discontinuous Reception (DRX) mode, according to various embodiments discussed herein.

Referring to FIG. 10, illustrated is a flow diagram of an example method employable at a UE that facilitates Beam Failure (BF) detection and recovery by the UE when operating in Discontinuous Reception (DRX) mode, according to various embodiments discussed herein. In other aspects, a machine readable medium can store instructions associated with method 1000 that, when executed, can cause a UE (e.g., employing system $400_{UE}$) to perform the acts of method 1000.

At 1010, higher layer signaling can be received that configures one or more occasions for signaling (e.g., SSB and/or CSI-RS) for BF of a beam in a cell for a DRX cycle of the UE, including at least one occasion during a DRX on duration of the UE, and one or more optional occasions outside the DRX on duration.

At 1020, the signaling for BF can be measured (e.g., via determining an associated beam quality metric) for at least one occasion of the one or more occasions.

At 1030, a determination can be made, based on the measured signaling for BF, whether BF of the beam has occurred.

Optionally, at 1040, if BF has occurred, a BF recovery request can be transmitted. This can involve transmitting the BF recovery request via PRACH (e.g., contention-based or contention-free), or via a UL grant in response to a SR via PUCCH.

Optionally, at 1050, at least one DRX timer (e.g., DRX on duration timer and/or DRX inactivity timer) can be one or more of paused, reset, stopped, restarted, or expired based on one or more of the detected BF, BF recovery request, or a response received to the BF recovery request, as described in greater detail in connection with the second set of techniques. For example, in response to a detected BF, the DRX on duration timer and/or DRX inactivity timer can be paused and/or reset (or, e.g., for a SCell, can be allowed to continue running in some embodiments). In response to a successful BF recovery response, the DRX on duration timer and/or DRX inactivity timer can be restarted. Alternatively, in various embodiments, in response to a determination that BF recovery has failed, one or more DRX timers can be expired, and the UE can enter a sleep state.

Additionally or alternatively, method 1000 can include one or more other acts described herein in connection with various embodiments of a UE and/or system $400_{UE}$ and the second set of techniques.

Figure 11:
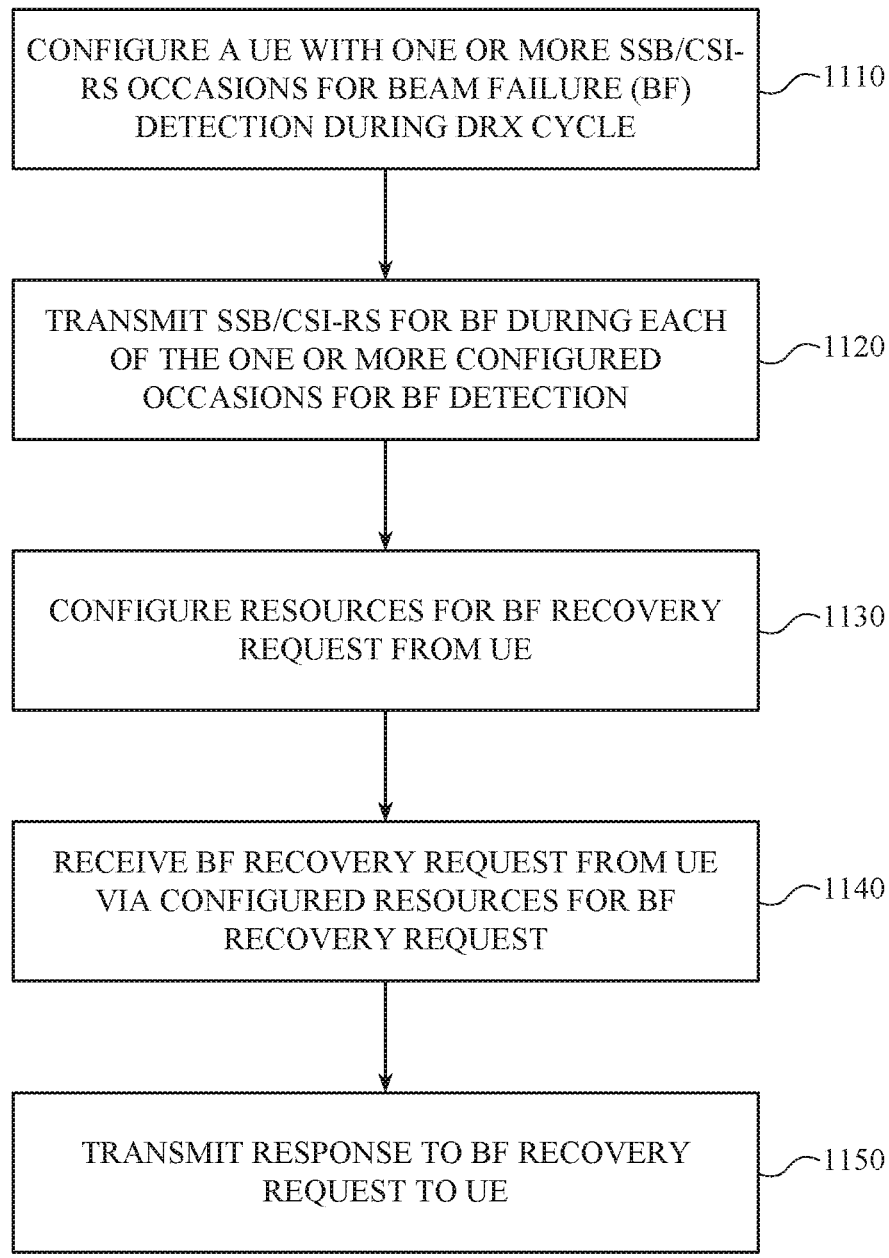
FIG. 11 is a flow diagram of an example method employable at a gNB that facilitates Beam Failure (BF) detection and recovery by a UE when operating in Discontinuous Reception (DRX) mode, according to various embodiments discussed herein.

Referring to FIG. 11, illustrated is a flow diagram of an example method employable at a gNB that facilitates Beam Failure (BF) detection and recovery by a UE when operating in Discontinuous Reception (DRX) mode, according to various embodiments discussed herein. In other aspects, a machine readable medium can store instructions associated with method 1100 that, when executed, can cause a gNB (e.g., employing system $400_{gNB}$) to perform the acts of method 1100.

At 1110, configuration signaling can be transmitted configuring one or more SSB/CSI-RS for BF detection during a DRX cycle of the UE, which can include a first SSB/CSI-RS during a DRX on duration of the UE and one or more other SSB/CSI-RS outside the DRX on duration of the UE.

At 1120, the configured SSB/CSI-RS for BF can be transmitted during the configured occasions.

At 1130, resources can be configured for the UE to generate a BF recovery request. Depending on the cell, this can involve configuring contention-free or contention-based PRACH (e.g., which can comprise different PRACH resources for different beams, in some embodiments), or transmitting DCI that schedules a UL grant in response to a SR from the UE.

At 1140, a BF recovery request can be received from the UE via the resources configured for the BF recovery request.

At 1150, a response to the BF recovery request can be transmitted to the UE.

Additionally or alternatively, method 1100 can include one or more other acts described herein in connection with various embodiments of a gNB and/or system $400_{gNB}$ and the second set of techniques.

Techniques Related to Bursty Beam Measurement and Reporting

The third set of techniques comprise techniques related to beam measurement and reporting by a UE operating in DRX mode relative to one or more cells (e.g., a PCell, and optionally a PSCell, alone, or in addition to one or more other SCells) from one or more gNBs (e.g., employing a system $400_{gNB}$, etc.). In various embodiments of the third set of techniques, except as otherwise specified, each beam can be handled separately, whereby techniques discussed herein can be separately applied by a UE and/or gNB in connection with one or more beams.

Signaling (e.g., SSB and/or CSI-RS) can be configured for beam measurement or reporting during a DRX on duration of the UE (e.g., at the beginning) or prior to the DRX on duration. Beam measurement reports can be configured to be periodic reports (e.g., over PUCCH, such at the beginning of or before the DRX on duration), semi-persistently configured reports (e.g., which can be activated together with a long DRX cycle activation), and/or aperiodic reports (e.g., which in various embodiments can be triggered by the gNB or triggered by the UE, as discussed in greater detail below). In some embodiments, bursty beam management update according to the third set of techniques can be part of the DRX on duration of the UE or at the beginning of the DRX on duration of the UE. In various embodiments, whether the UE is to perform bursty beam management can be indicated to the UE via a power saving signal (e.g., a Wake Up Signal (WUS)).

In various embodiments, a wake up request signal can be employed, which can be a signal transmitted by the UE to request DRX wake up of the UE from a gNB (e.g., with the wake up request signal generated by processor(s) $410_{UE}$, transmitted by communication circuitry $420_{UE}$, received by communication circuitry $420_{gNB}$, and processed by processor(s) $410_{gNB}$). In various scenarios, a UE can detect significant beam change (e.g., based on UE sensors (e.g., detecting rotation, motion, etc.) and/or SSB/CSI-RS from a gNB) of which a gNB might not be aware. In various embodiments, when the UE detects significant (e.g., based on one or more thresholds, etc.) beam change, the UE can transmit a wake up request signal, requesting DRX wake up from the gNB. In some such embodiments, the wake up request signal can also be treated as a request for aperiodic CSI-RS for a beam management update.

In various embodiments, before the DRX on duration, the gNB can configure one or more UL signals (e.g., PRACH, PUCCH, a PUSCH grant, etc.) that the UE can employ as a wake up request signal. In some embodiments, different resources can be configured for different UE beams. In various embodiments, the beam used for transmission of the UE wake up request signal can be preconfigured as SRI (SRS (Sounding Reference Signal) Resource Indicator), TCI (Transmission Configuration Indicator). In various embodiments, the beam used for transmission of the UE wake up request signal can employ resources (e.g., in its associated physical channel) that can be mapped to SSB/CSI-RS for beam measurement and/or candidate beam selection in one of a one-to-one or many-to-one manner, as described in greater detail herein.

Figure 12:
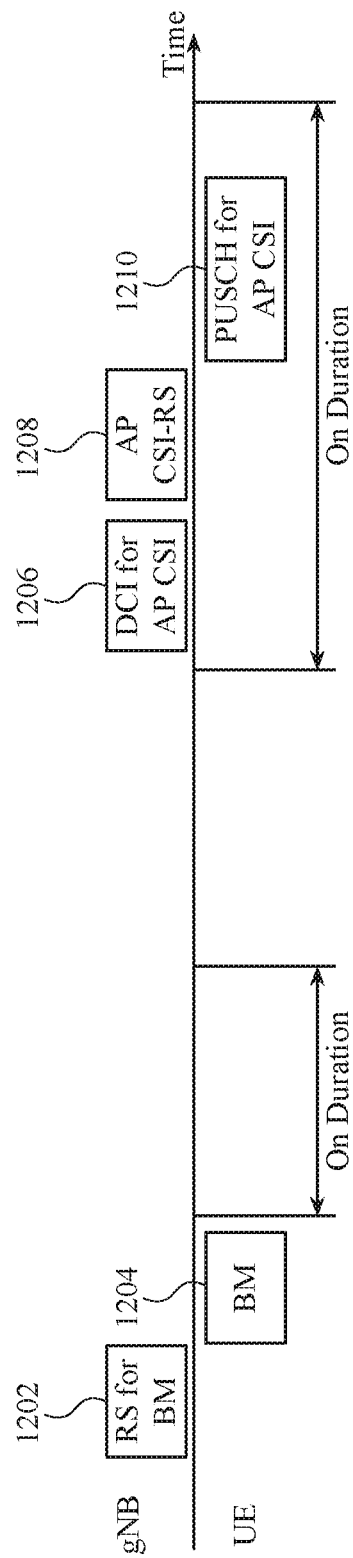
FIG. 12 is an example timing diagram showing two different types of beam measurement reports, according to various embodiments discussed herein.

Referring to FIG. 12, illustrated is an example timing diagram showing two different types of beam measurement reports, according to various embodiments discussed herein. In FIG. 12, prior to a first DRX on duration, SSB and/or CSI-RS 1202 can be transmitted by the gNB for a periodically configured beam management report 1204 by a UE, which can be generated based on UE measurements of SSB/CSI-RS 1202. Additionally, during a second DRX on duration of FIG. 12, DCI 1206 is shown scheduling CSI-RS 1208 for an aperiodic beam management report 1210 (via PUSCH) that can be generated based on UE measurements of CSI-RS 1208.

Figure 13:
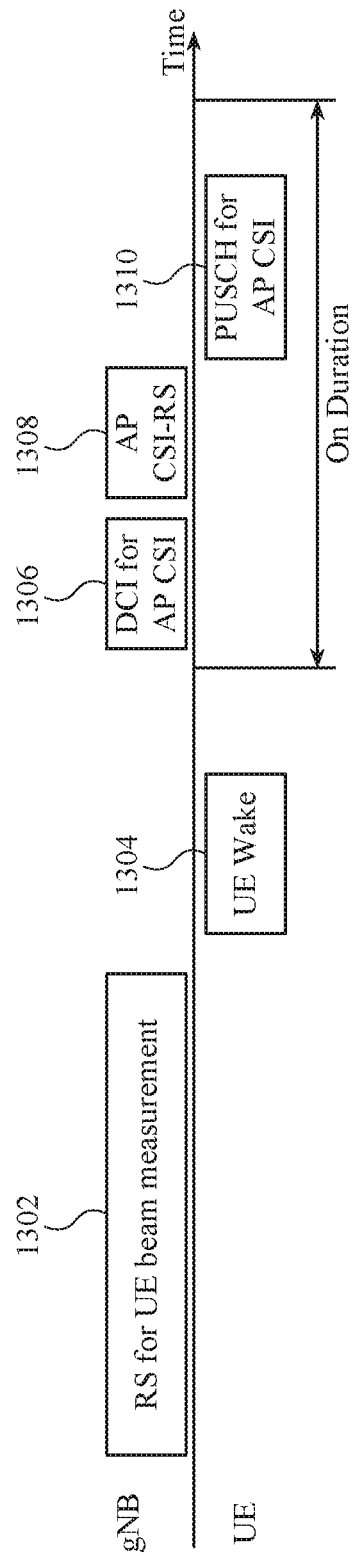
FIG. 13 is an example timing diagram showing a beam measurement report triggered by UE signaling, according to various aspects discussed herein.

Referring to FIG. 13, illustrated is an example timing diagram showing a beam measurement report triggered by UE signaling, according to various aspects discussed herein. In FIG. 13, SSB/CSI-RS for beam measurement 1302 can be measured by a UE, and based on the measured SSB/CSI-RS and/or UE sensors, a UE wake up request signal 1304 can be transmitted by the UE. In response to the UE wake up request signal 1304, the UE can wake up (e.g., begin DRX on duration) and gNB can schedule (via DCI 1306) aperiodic CSI-RS 1308, which the UE can use for bursty beam measurement, and the aperiodic UE beam measurement report can be transmitted in PUSCH 1310.

Figure 14:
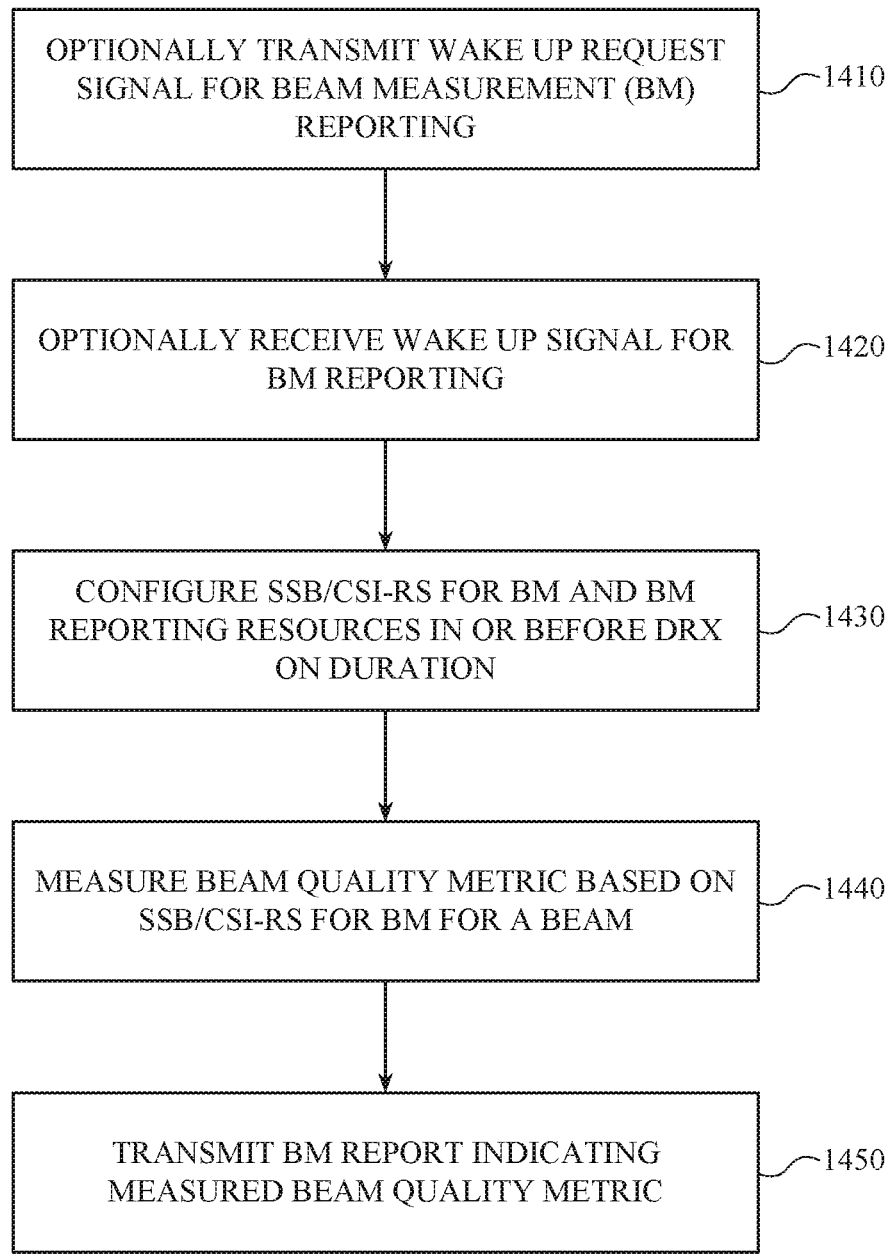
FIG. 14 is a flow diagram of an example method employable at a UE that facilitates beam measurement and reporting by the UE when operating in Discontinuous Reception (DRX) mode, according to various embodiments discussed herein.

Referring to FIG. 14, illustrated is a flow diagram of an example method employable at a UE that facilitates beam measurement and reporting by the UE when operating in Discontinuous Reception (DRX) mode, according to various embodiments discussed herein. In other aspects, a machine readable medium can store instructions associated with method 1400 that, when executed, can cause a UE (e.g., employing system $400_{UE}$) to perform the acts of method 1400.

At 1410, optionally, a wake up request signal can be transmitted to trigger aperiodic beam measurement reporting. The wake up request signal can be transmitted in response to a UE determination that a beam has or may have significantly changed, for example, based on measured SSB/CSI-RS and/or UE sensor(s).

At 1420, optionally, a wake up signal or other power saving signal can be received indicating that the UE should perform a bursty beam management update.

At 1430, signaling for beam measurement (e.g., SSB and/or CSI-RS) can be configured for the UE to perform beam measurement and reporting (e.g., within a DRX on duration, prior to a DRX on duration, etc.), along with resources for the UE to transmit a beam measurement report (e.g., during a DRX on duration). Depending on the nature of the report (e.g., periodic, aperiodic, semi-persistent, etc.), the channel, resources, and manner of configuration can vary.

At 1440, an associated beam quality metric can be measured for a beam based on the configured signaling for beam measurement received over that beam.

At 1450, the beam measurement report, indicating the associated beam quality metric, can be transmitted via the configured resources and associated physical channel.

Additionally or alternatively, method 1400 can include one or more other acts described herein in connection with various embodiments of a UE and/or system $400_{UE}$ and the third set of techniques.

Figure 15:
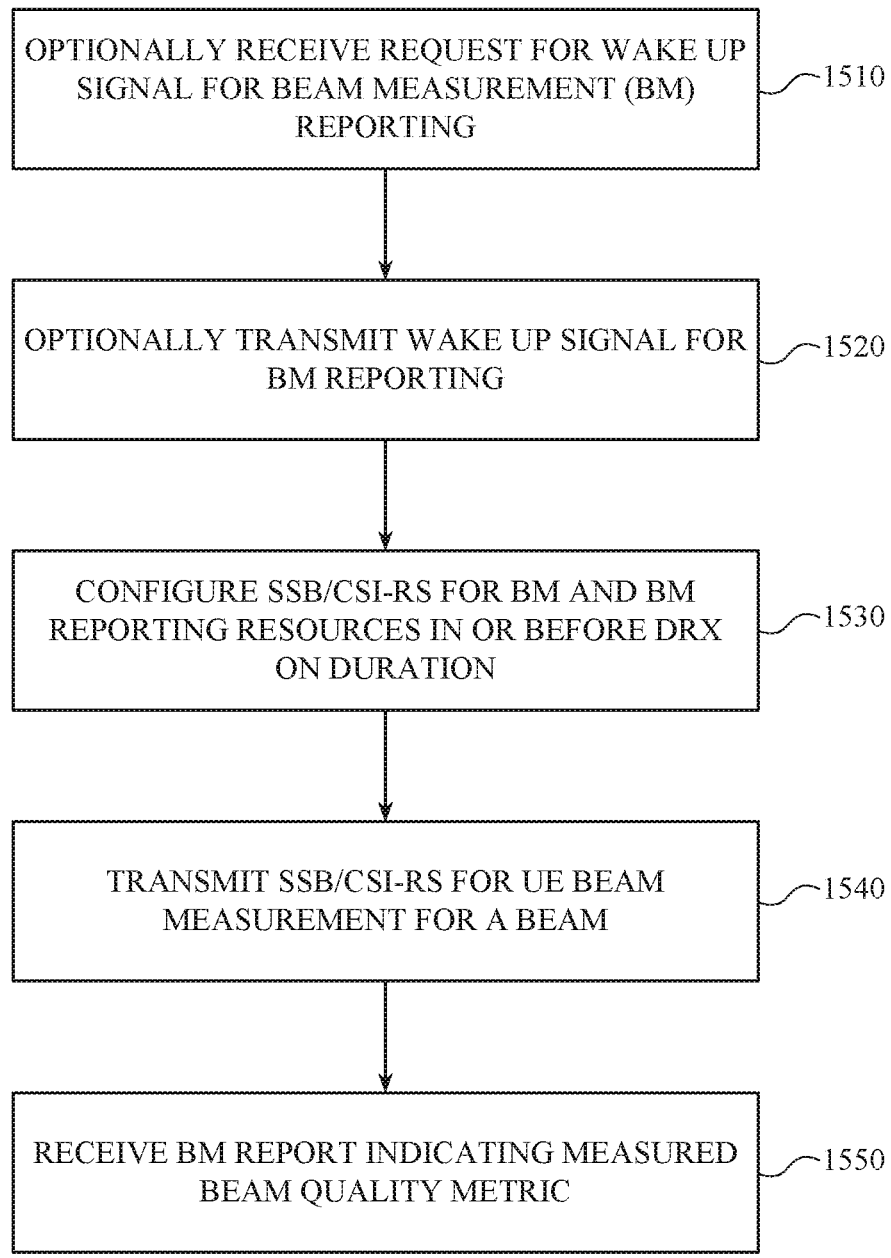
FIG. 15 is a flow diagram of an example method employable at a gNB that facilitates beam measurement and reporting by a UE when operating in Discontinuous Reception (DRX) mode, according to various embodiments discussed herein.

Referring to FIG. 15, illustrated is a flow diagram of an example method employable at a gNB that facilitates beam measurement and reporting by a UE when operating in Discontinuous Reception (DRX) mode, according to various embodiments discussed herein. In other aspects, a machine readable medium can store instructions associated with method 1500 that, when executed, can cause a gNB (e.g., employing system $400_{gNB}$) to perform the acts of method 1500.

At 1510, optionally, a wake up request signal can be received to trigger aperiodic beam measurement reporting. The wake up request signal can be transmitted in response to a UE determination that a beam has or may have significantly changed, for example, based on measured SSB/CSI-RS and/or UE sensor(s).

At 1420, optionally, a wake up signal or other power saving signal can be transmitted to the UE, indicating that the UE should perform a bursty beam management update.

At 1430, signaling for beam measurement (e.g., SSB and/or CSI-RS) can be configured for the UE to perform beam measurement and reporting (e.g., within a DRX on duration, prior to a DRX on duration, etc.), along with resources for the UE to transmit a beam measurement report (e.g., during a DRX on duration). Depending on the nature of the report (e.g., periodic, aperiodic, semi-persistent, etc.), the channel, resources, and manner of configuration can vary.

At 1440, the configured signaling for beam measurement can be transmitted over the beam.

At 1450, a beam measurement report, indicating the associated beam quality metric, can be received via the configured resources and associated physical channel.

Additionally or alternatively, method 1500 can include one or more other acts described herein in connection with various embodiments of a gNB and/or system $400_{gNB}$ and the third set of techniques.

Additional Examples

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a UE (User Equipment), comprising: one or more processors configured to: measure, for each beam of one or more beams, an associated beam quality metric for that beam based on signaling associated with that beam, wherein the signaling associated with that beam comprises one or more of a Synchronization Signal Block (SSB) associated with that beam or a Channel State Information Reference Signal (CSI-RS) associated with that beam; determine a best beam of the one or more beams based on the associated beam quality metric determined for each beam of the one or more beams; and generate, during a Discontinuous Reception (DRX) on duration of the UE, a Scheduling Request (SR) for transmission over the best beam.

Example 2 comprises the subject matter of any variation of any of example(s) 1, wherein, for each beam of the one or more beams, the signaling associated with that beam is mapped to an associated set of time-frequency resources within the DRX on duration.

Example 3 comprises the subject matter of any variation of any of example(s) 1, wherein, for each beam of the one or more beams, the signaling associated with that beam is mapped to an associated set of time-frequency resources prior to the DRX on duration.

Example 4 comprises the subject matter of any variation of any of example(s) 1-3, wherein the one or more processors are further configured to map the SR to a set of resources of a Physical Uplink Control Channel (PUCCH) that is uniquely associated with the signaling associated with the best beam.

Example 5 comprises the subject matter of any variation of any of example(s) 4, wherein, for each beam of the one or more beams, the one or more processors are configured to generate the SR based on a determination that the associated beam quality metric for the best beam is equal to or greater than a threshold value.

Example 6 comprises the subject matter of any variation of any of example(s) 1-3, wherein the one or more beams comprise a first beam that is different than the best beam, and wherein the one or more processors are further configured to map the SR to a set of resources of a Physical Uplink Control Channel (PUCCH) that is associated both with the signaling associated with the best beam and with the signaling associated with the first beam.

Example 7 comprises the subject matter of any variation of any of example(s) 1-6, wherein the associated beam quality metric measured for the best beam was based on at least a threshold number of measurements to estimate a path loss associated with the best beam, and wherein the one or more processors are further configured to: estimate the path loss associated with the best beam based at least in part on the associated beam quality metric; and select a transmit power for the SR based on the estimated path loss associated with the best beam.

Example 8 comprises the subject matter of any variation of any of example(s) 1-6, wherein the associated beam quality metric measured for a first beam of the one or more beams is a highest associated beam quality metric, wherein the highest associated beam quality metric was based on fewer than a threshold number of measurements to estimate a path loss associated with the best beam, and wherein the one or more processors are further configured to: select one of the first beam or a previous best beam as the best beam, wherein the previous best beam is associated with a previous path loss estimate; and select a transmit power for the SR based on the previous path loss estimate.

Example 9 comprises the subject matter of any variation of any of example(s) 1-8, wherein the one or more processors are further configured to monitor one or more of Downlink Control Information (DCI) for an Uplink (UL) grant, a Physical Downlink Shared Channel (PDSCH), a Physical Uplink Control Channel (PUCCH), or a Physical Uplink Shared Channel (PUSCH), via the best beam for which the SR was generated for transmission over.

Example 10 is an apparatus configured to be employed in a UE (User Equipment), comprising: one or more processors configured to: process higher layer signaling that configures for a cell, at each time of one or more times during a discontinuous reception (DRX) cycle of the UE, signaling associated with that time and with a first beam of the UE, wherein the signaling associated with that time and with the first beam comprises one or more of a Synchronization Signal Block (SSB) associated with that time and with the first beam or a Channel State Information Reference Signal (CSI-RS) associated with that time and with the first beam, and wherein the one or more times comprise a first time within a DRX on duration of the UE; measure, for at least one time of the one or more times, the signaling associated with the at least one time and with the first beam of the UE; and make a determination whether a beam failure of the first beam has occurred based on the measured signaling associated with the at least one time and with the first beam of the UE.

Example 11 comprises the subject matter of any variation of any of example(s) 10, wherein the one or more times during the DRX cycle of the UE comprise a second time outside of the DRX on duration of the UE.

Example 12 comprises the subject matter of any variation of any of example(s) 10-11, wherein, when the determination has been made that the beam failure of the first beam occurred, the one or more processors are further configured to: generate a beam failure recovery request; and map the beam failure recovery request to a set of resources, wherein, when the cell is a Primary Cell (PCell) or a Primary Secondary Cell (PSCell), the set of resources is associated with one of a contention-based Physical Random Access Channel (PRACH) or a contention free PRACH, and wherein, when the cell is a Secondary Cell, the set of resources is associated with a Physical Uplink Shared Channel (PUSCH) grant of the UE.

Example 13 comprises the subject matter of any variation of any of example(s) 12, wherein the one or more processors are further configured to stop a DRX on duration timer in response to the determination that the beam failure of the first beam occurred.

Example 14 comprises the subject matter of any variation of any of example(s) 13, wherein the one or more processors are further configured to reset the DRX on duration timer in response to the determination that the beam failure of the first beam occurred.

Example 15 comprises the subject matter of any variation of any of example(s) 13-14, wherein the one or more processors are further configured to restart the DRX on duration timer in response to processing a successful beam failure recovery response.

Example 16 comprises the subject matter of any variation of any of example(s) 13-14, wherein the one or more processors are further configured to: determine that the beam failure recovery request was unsuccessful; expire the DRX on duration timer; and enter a sleep state in response to an expiration of the DRX on duration timer.

Example 17 comprises the subject matter of any variation of any of example(s) 12-14, wherein the one or more processors are further configured to stop a DRX inactivity timer in response to the determination that the beam failure of the first beam occurred.

Example 18 comprises the subject matter of any variation of any of example(s) 17, wherein the one or more processors are further configured to reset the DRX inactivity timer in response to processing a successful beam failure recovery response.

Example 19 comprises the subject matter of any variation of any of example(s) 17-18, wherein the one or more processors are further configured to restart the DRX inactivity timer in response to processing a successful beam failure recovery response.

Example 20 is an apparatus configured to be employed in a UE (User Equipment), comprising: one or more processors configured to: measure a beam quality metric for a beam based on signaling associated with the beam, wherein the signaling associated with the beam comprises one or more of a Synchronization Signal Block (SSB) associated with the beam or a Channel State Information Reference Signal (CSI-RS) associated with the beam, wherein the signaling associated with the beam is mapped to an associated set of time-frequency resources within or prior to a Discontinuous Reception (DRX) on duration of the UE; and generate a beam measurement report that indicates the beam quality metric, wherein the beam measurement report is configured as one of periodic, semi-persistent, or aperiodic.

Example 21 comprises the subject matter of any variation of any of example(s) 20, wherein the one or more processors are configured to generate the beam measurement report in response to a power saving signal that indicates to the UE to wake up.

Example 22 comprises the subject matter of any variation of any of example(s) 20-21, wherein the beam measurement report is aperiodic, and wherein the one or more processors are further configured to: detect that the beam has changed by at least a threshold amount; and generate a request for a DRX wake up.

Example 23 is an apparatus configured to be employed in a next generation NodeB (gNB), comprising: one or more processors configured to: generate, for each beam of one or more beams, signaling associated with that beam, wherein the signaling associated with that beam comprises one or more of a Synchronization Signal Block (SSB) associated with that beam or a Channel State Information Reference Signal (CSI-RS) associated with that beam; and process, during a Discontinuous Reception (DRX) on duration of a User Equipment (UE), a Scheduling Request (SR) for transmission over a selected beam of the one or more beams.

Example 24 comprises the subject matter of any variation of any of example(s) 23, wherein, for each beam of the one or more beams, the signaling associated with that beam is mapped to an associated set of time-frequency resources within the DRX on duration.

Example 25 comprises the subject matter of any variation of any of example(s) 23, wherein, for each beam of the one or more beams, the signaling associated with that beam is mapped to an associated set of time-frequency resources prior to the DRX on duration.

Example 26 comprises the subject matter of any variation of any of example(s) 23-25, wherein the SR is mapped to a set of resources of a Physical Uplink Control Channel (PUCCH) that is uniquely associated with the signaling associated with the selected beam.

Example 27 comprises the subject matter of any variation of any of example(s) 23-25, wherein the one or more beams comprise a first beam that is different than the selected beam, and wherein the SR is mapped to a set of resources of a Physical Uplink Control Channel (PUCCH) that is associated both with the signaling associated with the selected beam and with the signaling associated with the first beam.

Example 28 comprises the subject matter of any variation of any of example(s) 23-27, wherein the one or more processors are further configured to generate a Downlink Control Information (DCI) for an Uplink (UL) grant in response to the SR, via the selected beam for which the SR was generated for transmission over.

Example 29 is an apparatus configured to be employed in a next generation NodeB (gNB), comprising: one or more processors configured to: generate higher layer signaling that configures for a cell, at each time of one or more times during a discontinuous reception (DRX) cycle of a User Equipment (UE), signaling associated with that time and with a first beam of the gNB, wherein the signaling associated with that time and with the first beam comprises one or more of a Synchronization Signal Block (SSB) associated with that time and with the first beam or a Channel State Information Reference Signal (CSI-RS) associated with that time and with the first beam, and wherein the one or more times comprise a first time within a DRX on duration of the UE; and process a beam failure recovery request associated with the first beam.

Example 30 comprises the subject matter of any variation of any of example(s) 29, wherein the one or more times during the DRX cycle of the UE comprise a second time outside of the DRX on duration of the UE.

Example 31 comprises the subject matter of any variation of any of example(s) 29-30, wherein the beam failure recovery request is mapped to a set of resources, wherein, when the cell is a Primary Cell (PCell) or a Primary Secondary Cell (PSCell), the set of resources is associated with one of a contention-based Physical Random Access Channel (PRACH) or a contention free PRACH, and wherein, when the cell is a Secondary Cell, the set of resources is associated with a Physical Uplink Shared Channel (PUSCH) grant of the UE.

Example 32 is an apparatus configured to be employed in a next generation Node B (gNB), comprising: one or more processors configured to: generate signaling associated with a beam, wherein the signaling associated with the beam comprises one or more of a Synchronization Signal Block (SSB) associated with the beam or a Channel State Information Reference Signal (CSI-RS) associated with the beam, wherein the signaling associated with the beam is mapped to an associated set of time-frequency resources within or prior to a Discontinuous Reception (DRX) on duration of a User Equipment (UE), and process a beam measurement report that indicates a beam quality metric associated with the beam, wherein the beam measurement report is configured as one of periodic, semi-persistent, or aperiodic.

Example 33 comprises the subject matter of any variation of any of example(s) 32, wherein the one or more processors are further configured to generate a power saving signal to indicate to the UE to wake up.

Example 34 comprises the subject matter of any variation of any of example(s) 32, wherein the beam measurement report is aperiodic, and wherein the one or more processors are further configured to process a request for a DRX wake up.

Example 35 comprises an apparatus comprising means for executing any of the described operations of examples 1-34.

Example 36 comprises a machine readable medium that stores instructions for execution by a processor to perform any of the described operations of examples 1-34.

Example 37 comprises an apparatus comprising: a memory interface; and processing circuitry configured to: perform any of the described operations of examples 1-34.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A baseband processor for a user equipment (UE) configured to, when executing instructions stored in a memory, perform operations comprising:
   determining by measuring, for each beam of one or more beams, an associated beam quality metric for that beam based on one or more of a Synchronization Signal Block (SSB) or a Channel State Information Reference Signal (CSI-RS) associated with that beam;
   selecting a beam of the one or more beams based on the associated beam quality metric, wherein the selected beam is mapped to a selected set of Physical Uplink Control Channel (PUCCH) resources; and
   generating, during a Discontinuous Reception (DRX) on duration of the UE, a Scheduling Request (SR) for transmission over the best selected beam using the selected set of PUCCH resources.

2. The baseband processor of claim 1, wherein, for each beam of the one or more beams, the one or more of the SSB or the CSI-RS is mapped to an associated set of time-frequency resources within the DRX on duration.

3. The baseband processor of claim 1, wherein, for each beam of the one or more beams, the one or more of the SSB or the CSI-RS is mapped to an associated set of time-frequency resources prior to the DRX on duration.

4. The baseband processor of claim 1, wherein the selected set of PUCCH is uniquely associated with the one or more of the SSB or the CSI-RS associated with the best selected beam.

5. The baseband processor of claim 4, wherein, for each beam of the one or more beams, the SR is generated based on a determination that the associated beam quality metric for the selected beam is equal to or greater than a threshold value.

6. The baseband processor of claim 1, wherein the selected set of PUCCH resources is mapped to both the selected beam and a first beam that is different than the best selected beam.

7. The baseband processor of claim 1, wherein the associated beam quality metric measured for the selected beam was based on at least a threshold number of measurements to estimate a path loss associated with the selected beam, and wherein the operations further comprises:
   estimating the path loss associated with the selected beam based at least in part on the associated beam quality metric; and
   selecting a transmit power for the SR based on the estimated path loss associated with the selected beam.

8. The baseband processor of claim 1,
   wherein the associated beam quality metric measured for a first beam of the one or more beams is a highest associated beam quality metric, wherein the highest associated beam quality metric is based on a number of measurements to estimate a path loss associated with the selected beam, and wherein the operations further comprises:
   select one of the first beam or a previous selected beam as the selected beam, wherein the previous selected beam is associated with a previous path loss estimate; and
   determine a transmit power for the SR based on the previous path loss estimate, if the number of measurements is fewer than a threshold number.

9. The baseband processor of claim 1, wherein the operations further comprises to monitor one or more of Downlink Control Information (DCI) for an Uplink (UL) grant, a Physical Downlink Shared Channel (PDSCH), a Physical Uplink Control Channel (PUCCH), or a Physical Uplink Shared Channel (PUSCH), via the best selected beam for which the SR was generated for transmission over.

10. UE (User Equipment), comprising:
    RF circuitry configured to convert between RF signals and baseband signals;
    one or more processors coupled to the RF circuitry and configured to process the baseband signals and cause the UE to:
    receive higher layer signaling that configures for a cell, at each time of one or more times during a discontinuous reception (DRX) cycle of the UE, one or more of a Synchronization Signal Block (SSB) or a Channel State Information Reference Signal (CSI-RS) associated with that time and with a first beam, and wherein the one or more times comprise a first time within a DRX on duration of the UE;
    measure the one or more of the SSB or the CSI-RS associated with the first time and with the first beam; and
    transmit an indication of a determination of whether a beam failure of the first beam has occurred based on the measuring of the one or more of the SSB or the CSI-RS.

11. The UE of claim 10, wherein the one or more times during the DRX cycle of the UE comprise a second time outside of the DRX on duration of the UE, and wherein the beam failure of the first beam is also determined based on measuring the one or more of the SSB or the CSI-RS associated with the second time.

12. The UE of claim 10, wherein, when the determination has been made that the beam failure of the first beam occurred, the one or more processors are further configured to cause the UE to:
    transmit a beam failure recovery request
    over a set of resources,
    wherein, when the cell is a Primary Cell (PCell) or a Primary Secondary Cell (PSCell), the set of resources is associated with one of a contention-based Physical Random Access Channel (PRACH) or a contention free PRACH, and
    wherein, when the cell is a Secondary Cell, the set of resources is associated with a Physical Uplink Shared Channel (PUSCH) grant of the UE.

13. The UE of claim 12, wherein the one or more processors are further configured to stop a DRX on duration timer in response to the determination that the beam failure of the first beam occurred.

14. The UE of claim 13, wherein the one or more processors are further configured to reset and restart the DRX on duration timer in response to the determination that the beam failure of the first beam occurred.

15. The UE of claim 13, wherein the one or more processors are further configured to:
determine that the beam failure recovery request was unsuccessful;
expire the DRX on duration timer; and
enter a sleep state in response to an expiration of the DRX on duration timer.

16. The UE of claim 12, wherein the one or more processors are further configured to stop a DRX inactivity timer in response to the determination that the beam failure of the first beam occurred.

17. The UE of claim 16, wherein the one or more processors are further configured to reset or restart the DRX inactivity timer in response to processing a successful beam failure recovery response.

18. A UE (User Equipment), comprising:
RF circuitry configured to convert between RF signals and baseband signals;
one or more processors coupled to the RF circuitry and configured to process the baseband signals and cause the UE to:
measure a beam quality metric for a beam based on one or more of a Synchronization Signal Block (SSB) or a Channel State Information Reference Signal (CSI-RS) associated with the beam, wherein the one or more of the SSB or the CSI-RS is mapped to an associated set of time-frequency resources within or prior to a Discontinuous Reception (DRX) on duration of the UE;
transmit a beam measurement report that indicates the beam quality metric, wherein the beam measurement report is configured as one of periodic, semi-persistent, or aperiodic; and
transmit, over a beam determined based on the beam quality metric, a scheduling request (SR) during the DRX on duration.

19. The UE of claim 18, wherein the one or more processors are configured to generate the beam measurement report in response to a power saving signal that indicates to the UE to wake up.

20. The UE of claim 18, wherein the beam measurement report is aperiodic, and wherein the one or more processors are further configured to
transmit a request for a DRX wake up for transmitting the beam measurement report, if the beam has changed by at least a threshold amount.

* * * * *